United States Patent
van Aartsen et al.

(10) Patent No.: US 11,802,604 B2
(45) Date of Patent: Oct. 31, 2023

(54) GAS SPRING AND DAMPER ASSEMBLIES AS WELL AS SUSPENSION SYSTEMS INCLUDING SAME

(71) Applicant: FIRESTONE INDUSTRIAL PRODUCTS COMPANY, LLC, Nashville, TN (US)

(72) Inventors: Jan van Aartsen, Arnhem (NL); Joseph A. Bounds, Hermitage, TN (US)

(73) Assignee: Firestone Industrial Products Company, LLC, Nashville, TN (US)

(*) Notice: Subject to any disclaimer, the term of this patent is extended or adjusted under 35 U.S.C. 154(b) by 90 days.

(21) Appl. No.: 17/293,882

(22) PCT Filed: Nov. 13, 2019

(86) PCT No.: PCT/US2019/061113
§ 371 (c)(1),
(2) Date: May 13, 2021

(87) PCT Pub. No.: WO2020/102298
PCT Pub. Date: May 22, 2020

(65) Prior Publication Data
US 2022/0120329 A1 Apr. 21, 2022

Related U.S. Application Data

(60) Provisional application No. 62/767,507, filed on Nov. 14, 2018.

(51) Int. Cl.
*F16F 9/084* (2006.01)
*B60G 15/10* (2006.01)

(52) U.S. Cl.
CPC .............. *F16F 9/084* (2013.01); *B60G 15/10* (2013.01)

(58) Field of Classification Search
CPC .. F16F 9/084; F16F 9/08; B60G 15/10; B60G 15/12; B60G 15/14
See application file for complete search history.

(56) References Cited

U.S. PATENT DOCUMENTS

| 4,659,070 A | 4/1987 | Buma |
| 4,660,810 A * | 4/1987 | Buma ................... B60G 11/30 188/313 |

(Continued)

FOREIGN PATENT DOCUMENTS

| DE | 4401770 A1 * | 8/1995 | ............. B60G 15/12 |
| DE | 10 2012 200389 A1 | 7/2013 | |

(Continued)

OTHER PUBLICATIONS

Translation JP H07167189 A. (Year: 1995).*

(Continued)

*Primary Examiner* — Thomas J Williams
(74) *Attorney, Agent, or Firm* — Thomas R. Kingsbury; Matthew P. Dugan

(57) ABSTRACT

A gas spring and damper assembly includes a damper assembly and a gas spring assembly. The gas spring assembly is axially coextensive with the damper assembly and includes a flexible spring member, a first end member assembly and a second end member assembly. The first end member assembly includes a first wall portion that extends about a longitudinal axis and defines an end member chamber. A second wall portion projects outwardly beyond an outer peripheral surface portion of the first wall portion. The second wall portion at least partially defines an intermediate chamber in fluid communication with the end member chamber and is dimensioned to receive an associated control device. A third wall portion at least partially defines an end member passage through which the end member chamber (Continued)

can be selectively placed in fluid communication with the spring chamber by way of the intermediate chamber and the associated control device.

20 Claims, 20 Drawing Sheets

(56) References Cited

U.S. PATENT DOCUMENTS

| | | |
|---|---|---|
| 4,768,758 A | 9/1988 | Buma |
| 2014/0070468 A1* | 3/2014 | Leonard ................ F16F 9/0472 267/64.27 |

FOREIGN PATENT DOCUMENTS

| | | | | |
|---|---|---|---|---|
| FR | 2573701 A1 | * | 5/1986 | .............. F16F 9/084 |
| JP | 62167944 A | * | 7/1987 | .............. F16F 9/084 |
| JP | 0203010 A | * | 2/1990 | .............. F16F 9/084 |
| JP | H07167189 A | * | 7/1995 | .............. B60G 15/14 |

OTHER PUBLICATIONS

International Search Report and Written Opinion dated Feb. 17, 2020 for corresponding International Application No. PCT/US2019/061113.

\* cited by examiner

GAS SPRING AND DAMPER ASSEMBLIES AS WELL AS SUSPENSION SYSTEMS INCLUDING SAME

This application is the National Stage of International Application No. PCT/US2019/061113, filed on Nov. 13, 2019, which claims the benefit of priority from U.S. Provisional Patent Application No. 62/767,507, filed on Nov. 14, 2018, the subject matter of which is hereby incorporated herein by reference in its entirety.

BACKGROUND

The subject matter of the present disclosure broadly relates to the art of gas spring devices and, more particularly, to gas spring and damper assemblies that include a secondary volume that can be selectively disposed in fluid communication with a primary spring volume to vary one or more performance characteristics of the gas spring and damper assembly. Suspension systems including one or more of such gas spring and damper assemblies are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring and damper assemblies of non-wheeled vehicles, support structures, height adjusting systems and actuators associated with industrial machinery, components thereof and/or other such equipment. Accordingly, the subject matter of the present disclosure is not intended to be limited to use associated with suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring elements as well as a plurality of damping devices that together permit the sprung and unsprung masses of the vehicle to move in a somewhat controlled manner relative to one another. Generally, the plurality of spring elements function to accommodate forces and loads associated with the operation and use of the vehicle, and the plurality of damping devices are operative to dissipate undesired inputs and movements of the vehicle, particularly during dynamic use and operation thereof. Movement of the sprung and unsprung masses toward one another is normally referred to in the art as jounce motion while movement of the sprung and unsprung masses away from one another is commonly referred to in the art as rebound motion.

In many applications involving vehicle suspension systems, it may be desirable to utilize spring elements that have as low of a spring rate as is practical, as the use of lower spring rate elements can provide improved ride quality and comfort compared to spring elements having higher spring rates. That is, it is well understood in the art that the use of spring elements having higher spring rates (i.e., stiffer springs) will transmit a greater magnitude of road inputs into the sprung mass of the vehicle and that this typically results in a rougher, less-comfortable ride. Whereas, the use of spring elements having lower spring rates (i.e., softer, more-compliant springs) will transmit a lesser amount of road inputs into the sprung mass and will, thus, provide a more comfortable ride. In some cases, it is possible to reduce the spring rate of gas springs, thereby improving ride comfort, by increasing the volume of pressurized gas operatively associated with the gas spring. This can be done by placing an additional chamber, cavity or volume filled with pressurized gas into fluid communication with the primary spring chamber of the gas spring.

Vehicle suspension systems also commonly include one or more dampers or damping components that are operative to dissipate energy associated with undesired inputs and movements of the sprung mass, such as road inputs occurring under dynamic operation of a vehicle, for example. Typically, such dampers are liquid filled and operatively connected between a sprung mass and an unsprung mass, such as between a body and an axle of a vehicle, for example. One example of such damping components are conventional shock absorbers that are commonly used in vehicle suspension systems.

Various disadvantages may exist with known gas spring constructions that include additional gas volumes to assist in reducing the spring rate of the gas spring, and at least some of these disadvantages involve controlling the movement of air between the two volumes. Accordingly, it is believed desirable to develop gas spring and damper devices that overcome the foregoing and/or other problems and/or disadvantages of known designs, and/or otherwise advance the art of gas spring devices.

BRIEF DESCRIPTION

One example of a gas spring and damper assembly in accordance with the subject matter of the present disclosure can include a damper assembly and a gas spring assembly. The damper assembly can have a longitudinally-extending axis and can include a damper housing and a damper rod assembly. The damper housing can include a housing wall extending axially between opposing first and second ends. The housing wall can at least partially define a damping chamber containing a quantity of damping fluid. The damper rod assembly can include an elongated damper rod and a damper piston secured along the elongated damper rod. The damper rod assembly can be operatively interengaged with the damper housing for reciprocal displacement relative thereto with the damper piston disposed within the damping chamber and at least a portion of the elongated damper rod projecting axially-outward from the first end of the damper housing. The gas spring assembly can be disposed in axially coextensive relation with at least a portion of the damper assembly. The gas spring assembly can include a flexible spring member extending peripherally about the longitudinal axis and longitudinally between opposing first and second ends such that a spring chamber is at least partially defined therebetween. A first end member assembly can be operatively connected to the elongated damper rod in substantially fixed axial relation thereto and can be operatively secured across the first end of the flexible spring member such that a substantially fluid-tight connection is formed therebetween. The first end member assembly can at least partially define an end member chamber. The first end member assembly can include an end member wall portion at least partially defining an end member passage through which the end member chamber can be selectively placed in fluid communication with the spring chamber. A second end member assembly can be supported on the damper housing in substantially fixed relation thereto and can be operatively secured across the second end of the flexible spring member such that a substantially fluid-tight connection is formed therebetween.

Another example of a gas spring and damper assembly in accordance with the subject matter of the present disclosure can include a damper assembly and a gas spring assembly. The damper assembly can have a longitudinally-extending axis and can include a damper housing with a housing wall extending axially between opposing first and second ends. The housing wall can at least partially define a damping chamber containing a quantity of damping fluid. A damper rod assembly can include an elongated damper rod and a damper piston secured along the elongated damper rod. The damper rod assembly can be operatively interengaged with the damper housing for reciprocal displacement relative thereto with the damper piston disposed within the damping chamber and at least a portion of the elongated damper rod projecting axially-outwardly from the first end of the damper housing. The gas spring assembly can be axially coextensive relation with at least a portion of the damper assembly. The gas spring assembly can include a flexible spring member extending peripherally about the longitudinal axis and longitudinally between opposing first and second ends such that a spring chamber is at least partially defined therebetween. A first end member assembly can be operatively connected to the elongated damper rod in substantially fixed axial relation thereto and can be operatively secured across the first end of the flexible spring member such that a substantially fluid-tight connection is formed therebetween. The first end member assembly can include a first end member wall that includes first, second and third wall portions. The first wall portion can extend peripherally about the longitudinal axis and at least partially defining an end member chamber. The first wall portion can have an outer peripheral surface portion. The second wall portion can project outwardly beyond the outer peripheral surface portion of the first wall portion. The second wall portion can at least partially define an intermediate chamber in fluid communication with the end member chamber and dimensioned to at least partially receive an associated control device. A third wall portion can at least partially define an end member passage through which the end member chamber can be selectively placed in fluid communication with the spring chamber by way of the intermediate chamber and the associated control device. A second end member assembly can be supported on the damper housing in substantially fixed relation thereto and operatively secured across the second end of the flexible spring member such that a substantially fluid-tight connection is formed therebetween.

One example of a suspension system in accordance with the subject matter of the present disclosure can include a pressurized gas system that includes a pressurized gas source and a control device. The suspension system can also include at least one gas spring and damper assembly according to either of the foregoing two paragraphs. The at least one gas spring and damper assembly can be disposed in fluid communication with the pressurized gas source through the control device such that pressurized gas can be selectively transferred into and out of the spring chamber.

DETAILED DESCRIPTION

Turning now to the drawings, it is to be understood that the showings are for purposes of illustrating examples of the subject matter of the present disclosure and that such examples are not intended to be limiting. Additionally, it will be appreciated that the drawings are not to scale and that portions of certain features and/or elements may be exaggerated for purposes of clarity and/or ease of understanding.

Figure 1:
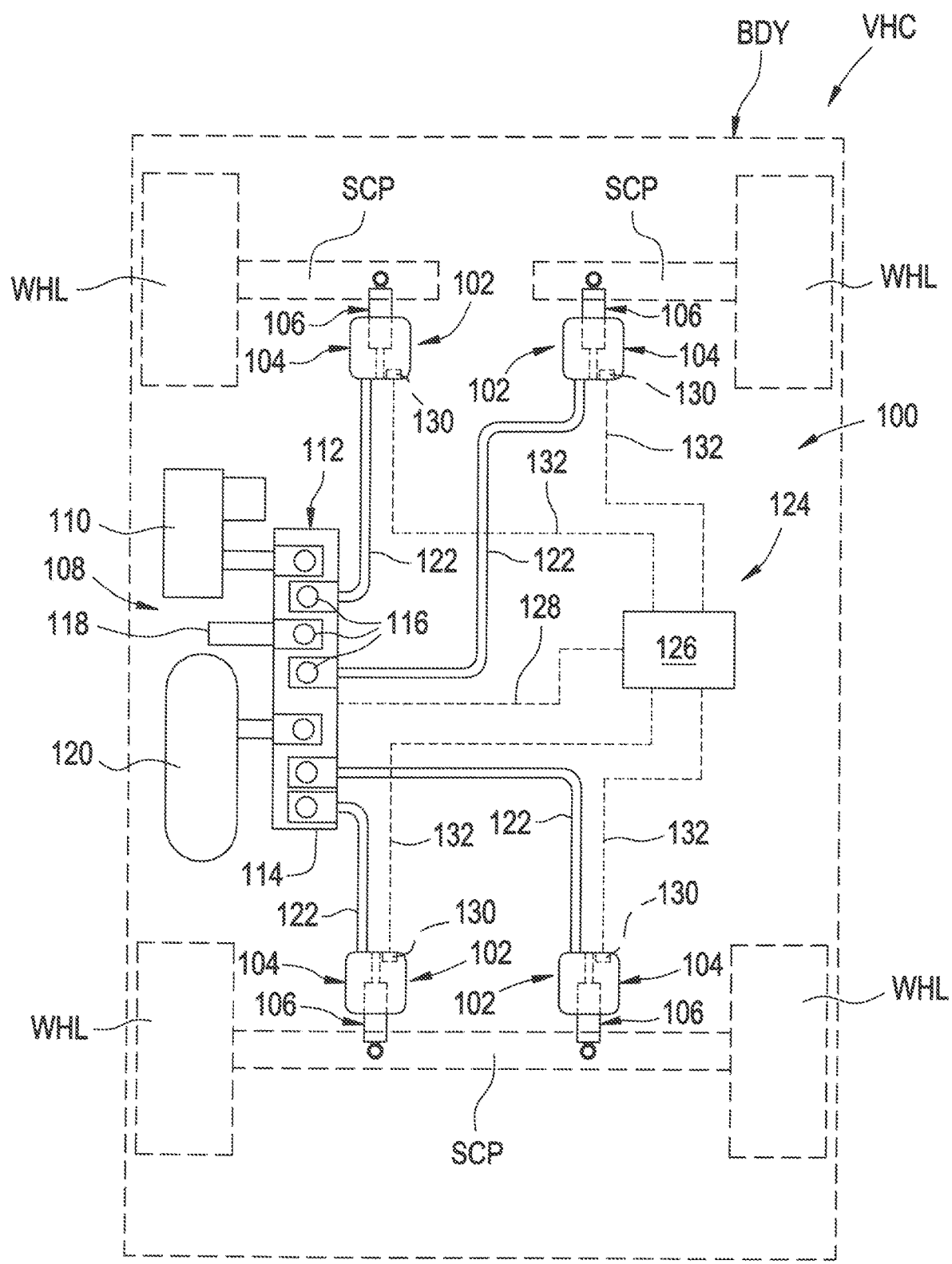
FIG. 1 is a schematic representation of one example of a suspension system of an associated vehicle that includes one or more gas spring and damper assemblies in accordance with the subject matter of the present disclosure.
Figure 2:
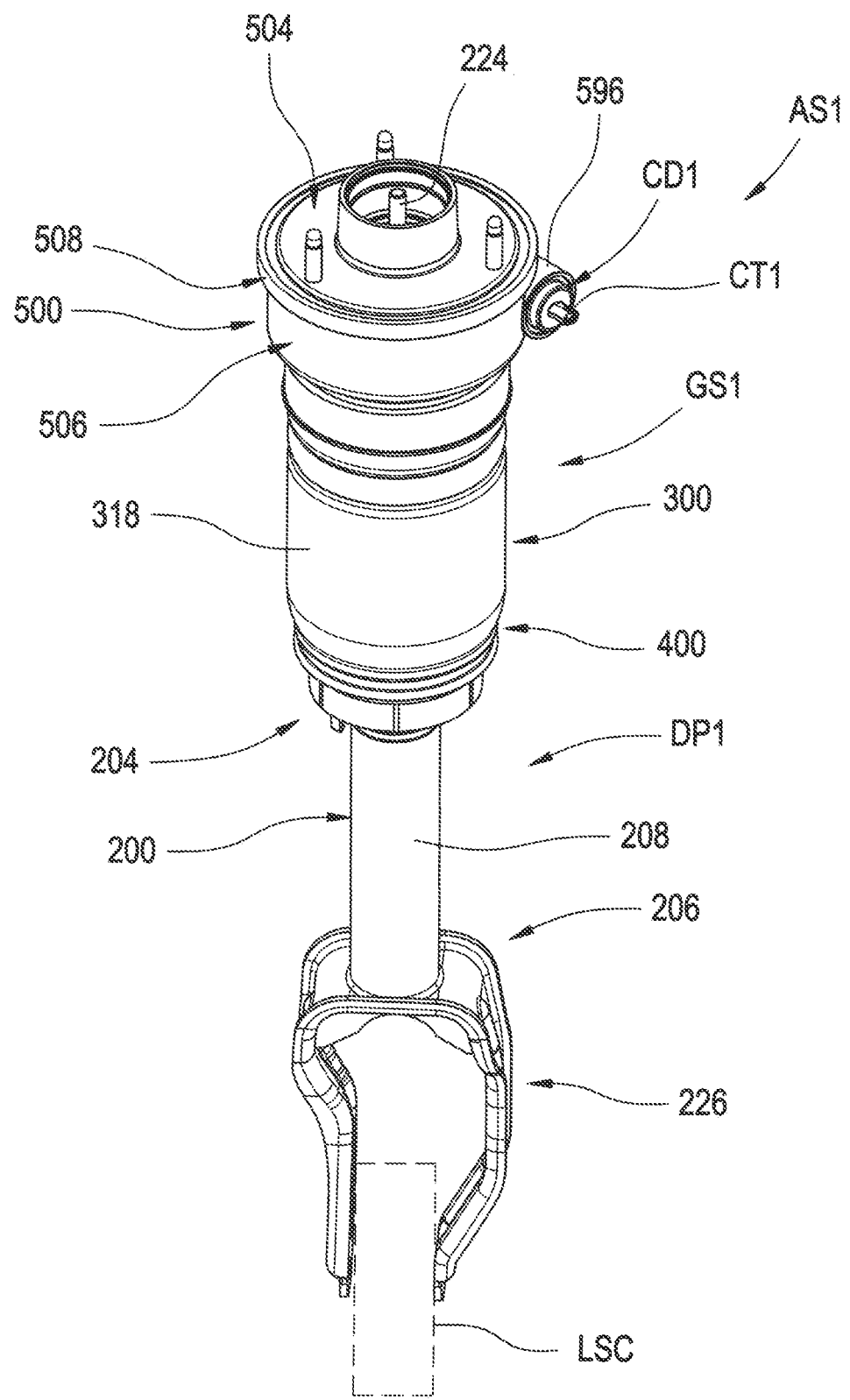
FIG. 2 is a top perspective view of one example of a gas spring and damper assembly in accordance with the subject matter of the present disclosure.
Figure 3:
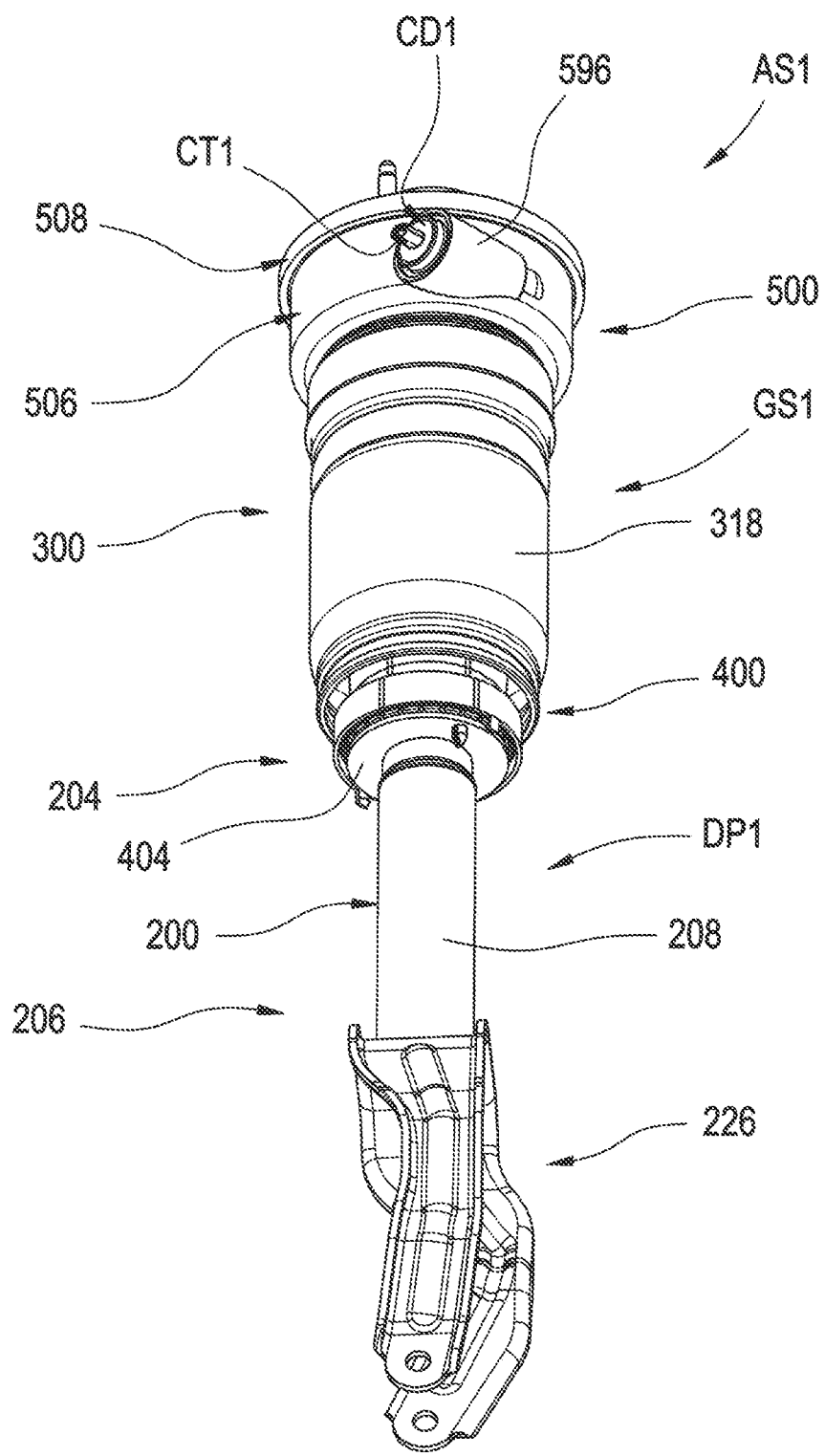
FIG. 3 is a bottom perspective view of the gas spring and damper assembly in FIG. 2.

FIG. 1 illustrates one example of a suspension system 100 operatively disposed between a sprung mass, such as an associated vehicle body BDY, for example, and an unsprung mass, such as an associated wheel WHL or an associated suspension component SCP, for example, of an associated vehicle VHC. It will be appreciated that any one or more of the components of the suspension system can be operatively connected between the sprung and unsprung masses of the associated vehicle in any suitable manner.

For example, in the arrangement shown, suspension system 100 can include a plurality of gas spring and damper assemblies 102 that are operatively connected between the sprung and unsprung masses of the vehicle. Depending on desired performance characteristics and/or other factors, the suspension system can include any suitable number of gas spring and damper assemblies. For example, in the arrangement shown in FIG. 1, suspension system 100 includes four gas spring and damper assemblies 102, one of which is disposed toward each corner of the associated vehicle adjacent a corresponding wheel WHL. It will be appreciated, however, that any other suitable number of gas spring and damper assemblies could alternately be used in any other configuration and/or arrangement. As shown in FIG. 1, gas spring and damper assemblies 102 are supported between suspension components SCP and body BDY of associated vehicle VHC, and include a gas spring (or gas spring assembly) 104 and a damper (or damper assembly) 106. It will be recognized that gas springs 104 are shown and described herein as being of a rolling lobe-type construction. It is to be understood, however, that gas spring assemblies of other types, kinds and/or constructions could alternately be used without departing from the subject matter of the present disclosure.

Suspension system 100 also includes a pressurized gas system 108 operatively associated with the gas spring and damper assemblies for selectively supplying pressurized gas (e.g., air) thereto and selectively transferring pressurized gas therefrom. In the exemplary embodiment shown in FIG. 1, pressurized gas system 108 includes a pressurized gas source, such as a compressor 110, for example, for generating pressurized air or other gases. A control device, such as a valve assembly 112, for example, is shown as being in communication with compressor 110 and can be of any suitable configuration or arrangement. In the exemplary embodiment shown, valve assembly 112 includes a valve block 114 with a plurality of valves 116 supported thereon. Valve assembly 112 can also, optionally, include a suitable exhaust, such as a muffler 118, for example, for venting pressurized gas from the system. Optionally, pressurized gas system 108 can also include a reservoir 120 in fluid communication with the compressor and/or valve assembly 112 and suitable for storing pressurized gas for an extended period of time (e.g., seconds, minutes, hours, weeks, days, months).

Valve assembly 112 is in communication with gas springs 104 and/or dampers 106 of assemblies 102 through suitable gas transfer lines 122. As such, pressurized gas can be selectively transferred into and/or out of the gas springs and/or the dampers through valve assembly 112 by selectively operating valves 116, such as to alter or maintain vehicle height at one or more corners of the vehicle, for example.

Suspension system 100 can also include a control system 124 that is capable of communication with any one or more systems and/or components (not shown) of vehicle VHC and/or suspension system 100, such as for selective operation and/or control thereof. Control system 124 can include a controller or electronic control unit (ECU) 126 communicatively coupled with compressor 110 and/or valve assembly 112, such as through a conductor or lead 128, for example, for selective operation and control thereof, which can include supplying and exhausting pressurized gas to and/or from gas spring and damper assemblies 102. Controller 126 can be of any suitable type, kind and/or configuration.

Control system 124 can also, optionally, include one or more sensing devices 130, such as, for example, may be operatively associated with the gas spring and damper assemblies and capable of outputting or otherwise generating data, signals and/or other communications having a relation to one or more of: a height of the gas spring and damper assemblies; a distance between other components of the vehicle; a pressure or temperature having a relation to the gas spring and damper assembly and/or a wheel or tire or other component associated with the gas spring and damper assembly; and/or an acceleration, load or other input acting on the gas spring and damper assembly. Sensing devices 130 can be in communication with ECU 126, which can receive the data, signals and/or other communications therefrom. The sensing devices can be in communication with ECU 126 in any suitable manner, such as through conductors or leads 132, for example. Additionally, it will be appreciated that the sensing devices can be of any suitable type, kind and/or construction and can operate using any suitable combination of one or more operating principles and/or techniques.

Figure 4:
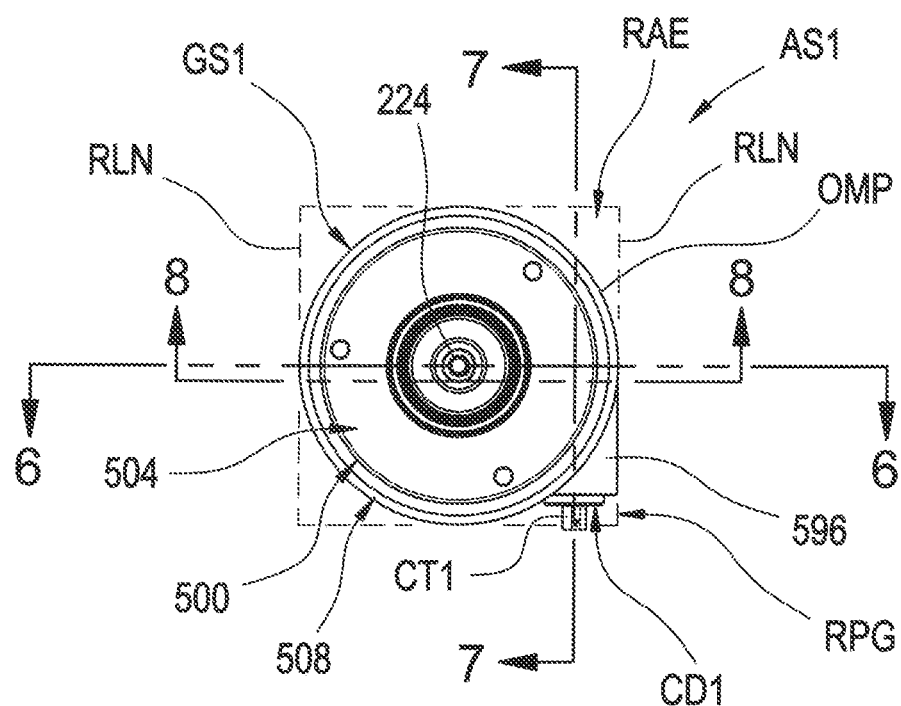
FIG. 4 is a top plan view of the gas spring and damper assembly in FIGS. 2 and 3.
Figure 5:
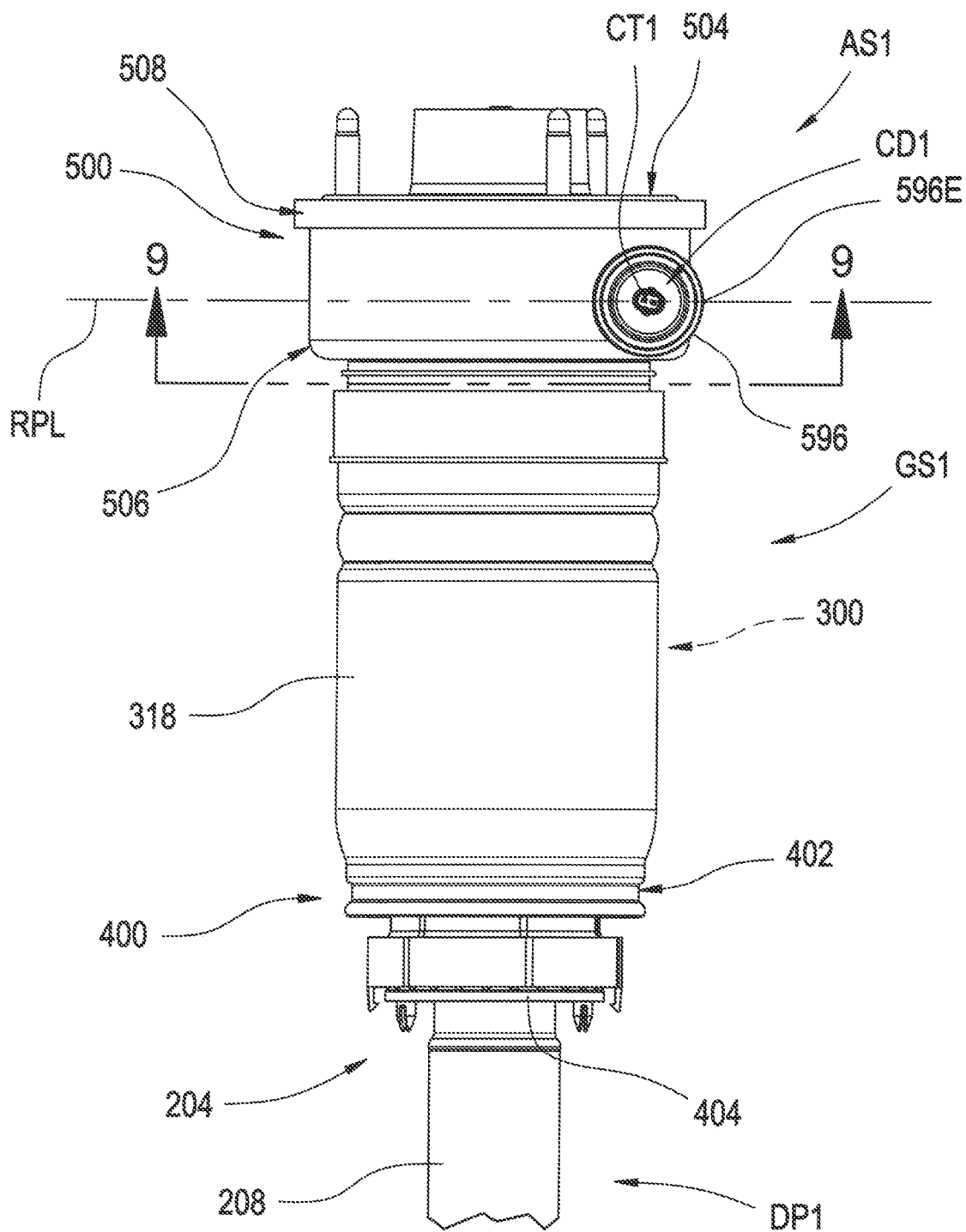
FIG. 5 is a side elevation view of the gas spring and damper assembly in FIGS. 2-4.
Figure 6:
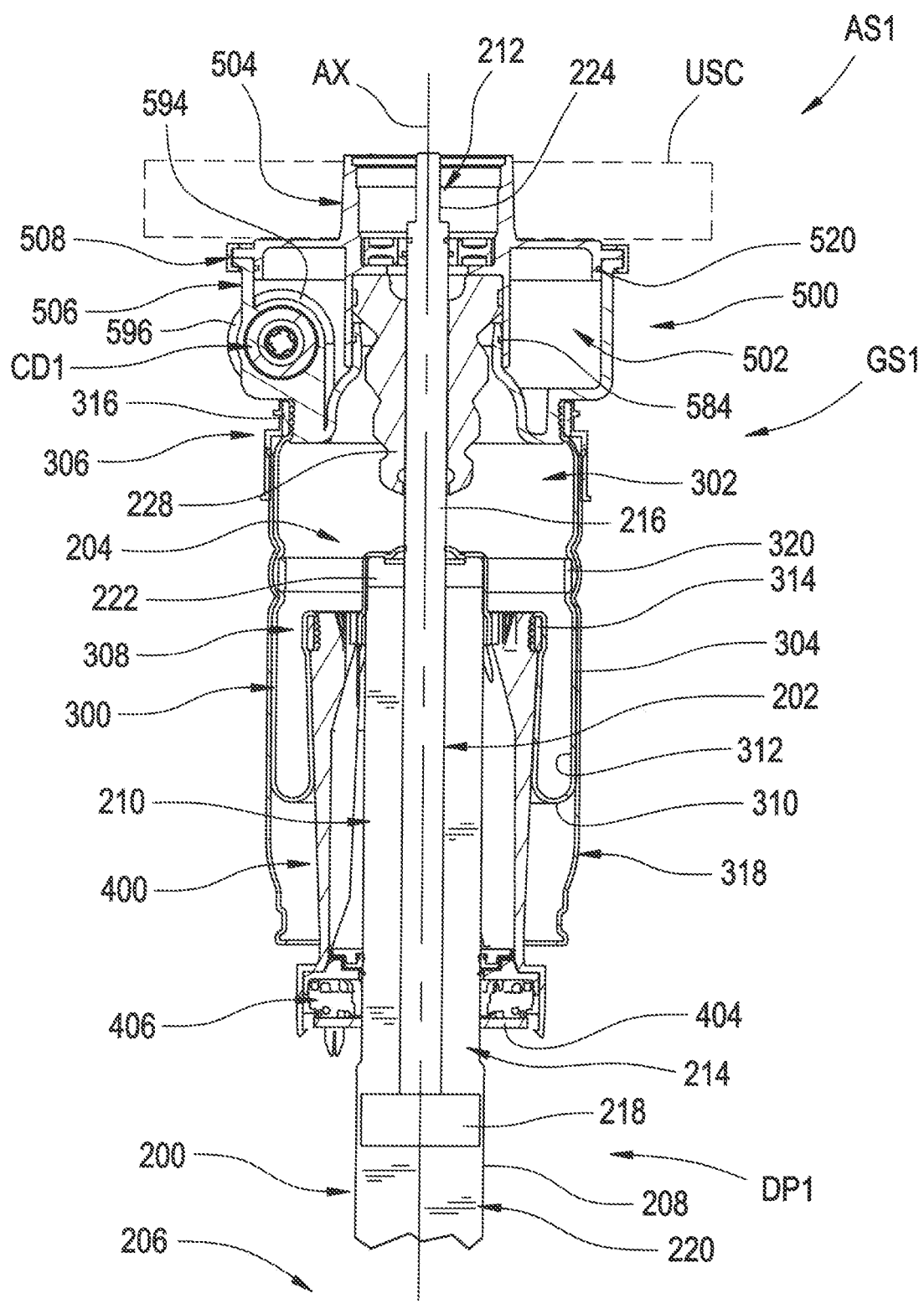
FIG. 6 is a cross-sectional side view of the gas spring and damper assembly in FIGS. 2-5 taken from along line 6-6 in FIG. 4.
Figure 7:
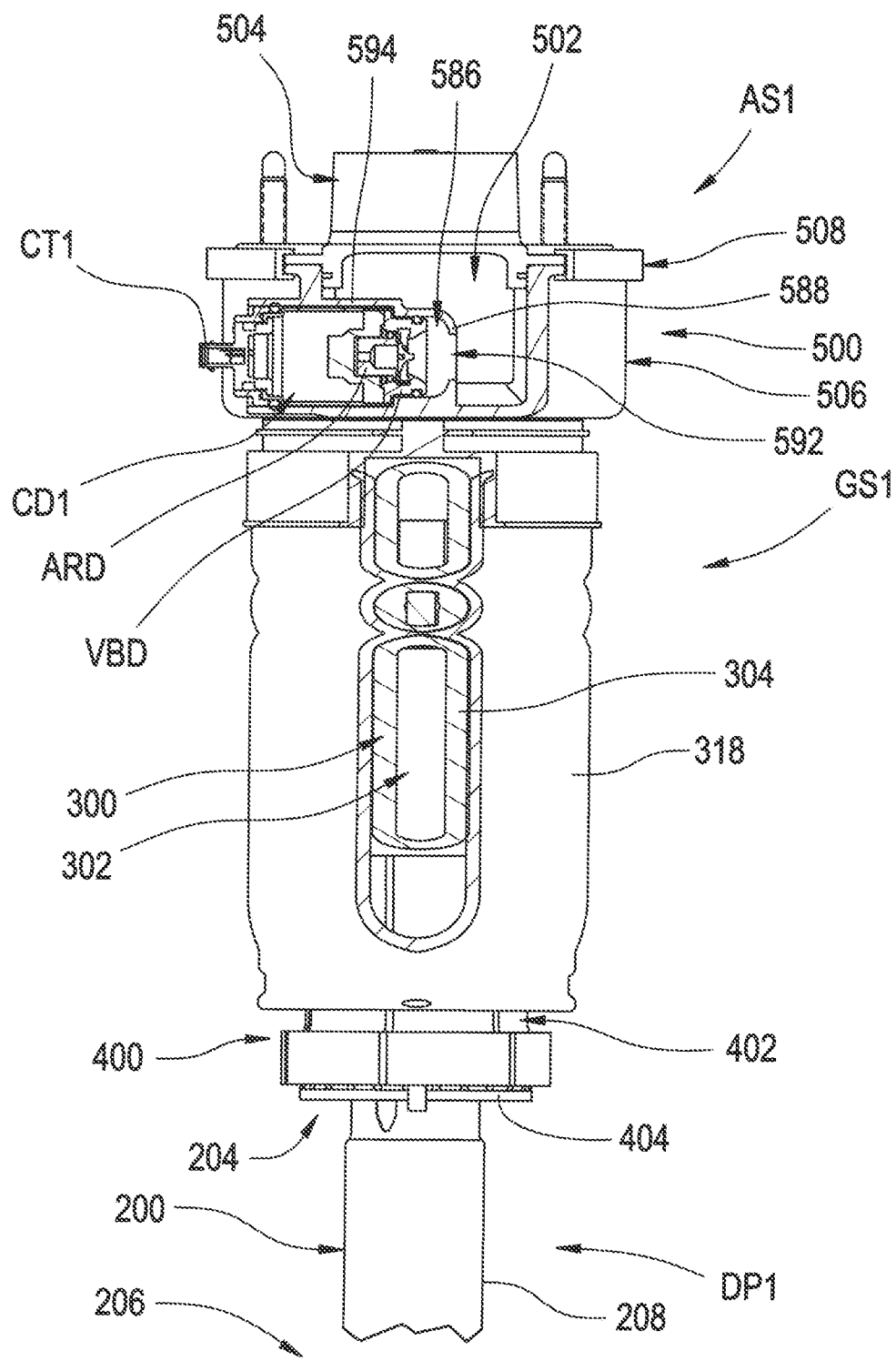
FIG. 7 is a cross-sectional side view of the gas spring and damper assembly in FIGS. 2-6 taken from along line 7-7 in FIG. 4.
Figure 8:
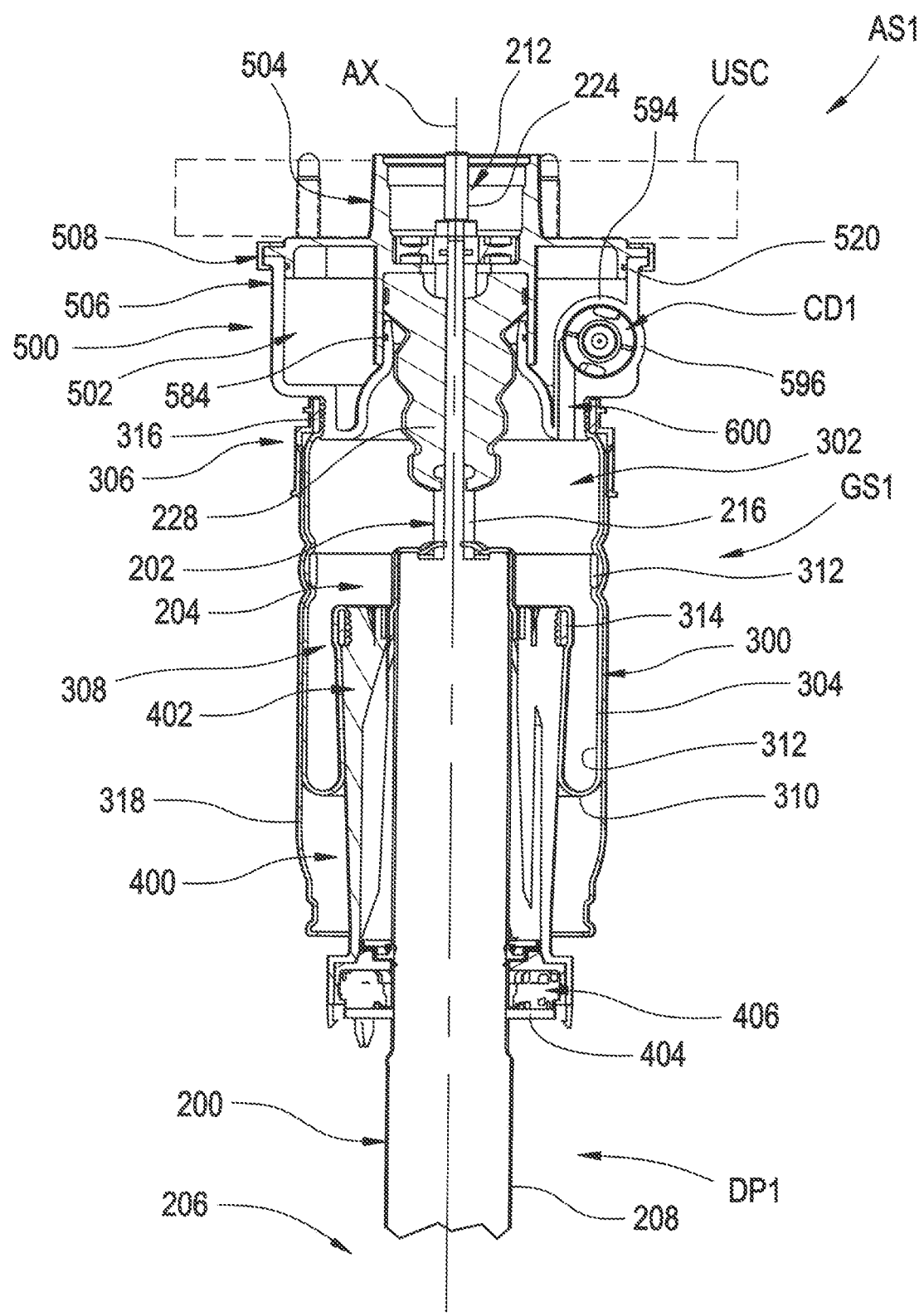
FIG. 8 is a cross-sectional side view of the gas spring and damper assembly in FIGS. 2-7 taken from along line 8-8 in FIG. 4.

Having described an example of a suspension system (e.g., suspension system 100) that can include gas spring and damper assemblies in accordance with the subject matter of the present disclosure, an example of such a gas spring and damper assembly will now be described in connection with FIGS. 2-9. As shown therein, a gas spring and damper assembly AS1, such as may be suitable for use as one or more of gas spring and damper assemblies 102 in FIG. 1, is shown as including a gas spring (or gas spring assembly) GS1, such as may correspond to one of gas springs 104 in FIG. 1, for example, and a damper (or damper assembly) DP1 such as may correspond to one of dampers 106 in FIG. 1, for example. Gas spring assembly GS1 and damper assembly DP1 can be disposed in a coextensive arrangement with one another, and can be operatively secured to one another in any suitable manner, such as is described hereinafter, for example. A longitudinal axis AX extends lengthwise along assembly AS1, as shown in FIGS. 6 and 8.

Damper assembly DP1 can include a damper housing 200 and a damper rod assembly 202 that is at least partially received in the damper housing. Damper housing 200 extends axially between housing ends 204 and 206, and includes a housing wall 208 that at least partially defines a damping chamber 210. Damper rod assembly 202 extends lengthwise between opposing ends 212 and 214 and includes an elongated damper rod 216 and a damper piston 218 disposed along end 214 of damper rod assembly 202. Damper piston 218 is received within damping chamber 210 of damper housing 200 for reciprocal movement along the housing wall in a conventional manner. A quantity of damping fluid 220 can be disposed within damping chamber 210, and damper piston 218 can be displaced through the damping fluid to dissipate kinetic energy acting on gas spring and damper assembly AS1. Though damper assembly DP1 is shown and described herein as having a conventional construction in which a hydraulic fluid is contained within at least a portion of damping chamber 210, it will be recognized and appreciated that dampers of other types, kinds and/or constructions, such as pressurized gas or "air" dampers, for example, could be used without departing from the subject matter of the present disclosure.

That is, it will be appreciated that a gas spring and damper assembly in accordance with the subject matter of the present disclosure can, in some cases, include a damper of an otherwise conventional construction that utilizes hydraulic oil or other liquid as a working medium of the damper. In other cases, the damper can be of a type and kind that utilizes pressurized gas as a working medium. In such cases, such a gas damper can include one or more elongated gas damping passages through which pressurized gas can flow to generate pressurized gas damping to dissipate kinetic energy acting on the gas spring and damper assembly. It will be appreciated that such one or more elongated gas damping passages can be of any suitable size, shape, configuration and/or arrangement. Additionally, it will be appreciated that any number of one or more features and/or components can be used, either alone or in combination with one another, to form or otherwise establish such one or more elongated gas damping passages.

Housing wall 208 can form an opening (not numbered) along housing end 204. A damper end wall 222 can extend across the opening and can be secured on or along housing wall 218 such that a substantially fluid-tight connection is formed therebetween. Damper end wall 222 can include an opening (not numbered) and elongated damper rod 216 can extend axially outward from damping chamber 210 through the opening in a direction opposite housing end 206. Additionally, a damper end wall (not numbered) can be connected across end 206 of damper housing 200 such that a substantially fluid-tight connection is formed therebetween.

Elongated damper rod 216 can project outwardly from damper end wall 222 such that end 212 of the damper rod assembly is outwardly exposed from the damper housing and is externally accessible with respect to the damper housing. A connection structure 224, such as a plurality of threads, for example, can be provided on or along the elongated rod for use in operatively connecting gas spring and damper assembly 200 to an associated vehicle structure, a component of gas spring assembly GS1 or another component of gas spring and damper assembly 200.

It will be appreciated that gas spring and damper assembly 200 can be operatively connected between associated sprung and unsprung masses of an associated vehicle (or other construction) in any suitable manner. For example, one end of the assembly can be operatively connected to an associated sprung mass with the other end of the assembly disposed toward and operatively connected to an associated unsprung mass. As shown in FIG. 8, for example, end 212 of damper rod assembly 202 can be operatively engaged (either directly or indirectly) with a first or upper structural component USC, such as associated vehicle body BDY in FIG. 1, for example, and can be secured thereon in any suitable manner. Additionally, or in the alternative, damper assembly DP1 can include a mounting bracket 226 disposed along end 206 of damper housing 200, which can be secured on or along a second or lower structural component LSC (FIG. 2), such as associated structural component SCP in FIG. 1, for example, and can be secured thereon in any suitable manner.

Gas spring assembly GS1 can include a flexible spring member 300 that can extend peripherally around axis AX and can be secured between opposing end members (or end member assemblies) 400 and 500 in a substantially fluid-tight manner such that a spring chamber 302 is at least partially defined therebetween. End member 400 can be secured on or along damper housing 200 in a suitable manner, such as are disclosed and described in U.S. Pat. No. 10,260,590, for example. End member 400 can include an end member wall 402 that can include any suitable number of one or more walls and/or wall portions. A support ring 404 can be secured on or along the exterior of damper housing 200. A rotational support and sealing assembly 406 can be operatively disposed between end member 400 and support ring 404. For example, assembly 406 can form a substantially fluid-tight connection between damper housing 200 and end member 400 that also permits rotational movement of the end member relative to the damper housing. In a preferred arrangement, end member 400 is supported on or along damper housing 200 such that forces and loads acting on one of upper and lower structural components USC and LSC can be transmitted or otherwise communicated to the other of upper and lower structural components USC and LSC at least partially through gas spring and damper assembly AS1.

It will be appreciated that flexible spring member 300 can be of any suitable size, shape, construction and/or configuration. Additionally, the flexible spring member can be of any type and/or kind, such as a rolling lobe-type or convoluted bellows-type construction, for example. Flexible spring member 300 is shown in FIGS. 1-9 as including a flexible wall 304 that can be formed in any suitable manner and from any suitable material or combination of materials. For example, the flexible wall can include one or more fabric-reinforced, elastomeric plies or layers and/or one or more un-reinforced, elastomeric plies or layers. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible wall 304 can extend in a generally longitudinal direction between opposing ends 306 and 308. Additionally, flexible wall 304 can include an outer surface 310 and an inner surface 312. The inner surface can at least partially define spring chamber 302 of gas spring assembly GS1. Flexible wall 304 can include an outer or cover ply (not identified) that at least partially forms outer surface 310. Flexible wall 304 can also include an inner or liner ply (not identified) that at least partially forms inner surface 312. In some cases, flexible wall 304 can further include one or more reinforcing plies (not shown) disposed between outer and inner surfaces 310 and 312. The one or more reinforcing plies can be of any suitable construction and/or configuration. For example, the one or more reinforcing plies can include one or more lengths of filament material that are at least partially embedded therein. Additionally, it will be appreciated that the one or more lengths of filament material, if provided, can be oriented in any suitable manner. As one example, the flexible wall can include at least one layer or ply with lengths of filament material oriented at one bias angle and at least one layer or ply with lengths of filament material oriented at an equal but opposite bias angle.

Flexible spring member 300 can include any feature or combination of features suitable for forming a substantially fluid-tight connection with end member 400 and/or end member 500. As one example, flexible spring member 300 can include open ends that are secured on or along the corresponding end members by way of one or more crimp rings 314 and 316. Alternately, a mounting bead (not shown) can be disposed along either or both of the ends of the flexible wall. In some cases, the mounting bead, if provided, can, optionally, include a reinforcing element, such as an endless, annular bead wire, for example. In some cases, a restraining cylinder 318 and/or other components can be disposed radially outward along flexible wall 304. In some cases, such components can be secured on or along the flexible wall in a suitable manner, such as by way or one or more backing rings 320, for example.

As mentioned above, gas spring and damper assembly AS1 can be disposed between associated sprung and unsprung masses of an associated vehicle in any suitable manner. For example, one component can be operatively connected to the associated sprung mass with another component disposed toward and operatively connected to the associated unsprung mass. As illustrated in FIG. 8, for example, end member assembly 500 can be operatively disposed along upper structural component USC, such as associated vehicle body BDY in FIG. 1, for example, and can be secured thereon in any suitable manner.

Additionally, it will be appreciated that the end members can be of any suitable type, kind, construction and/or configuration, and can be operatively connected or otherwise secured to the flexible spring member in any suitable manner. In the exemplary arrangement shown, end member assembly 500 is of a type commonly referred to as a reservoir housing and includes a plurality of walls and/or wall portions that at least partially define an end member chamber 502. In the arrangement shown in FIGS. 2-9, end member assembly 500 is shown as including an end member housing (or housing section) 504 and an end member housing (or housing section) 506 that are secured together to at least partially define end member assembly 500. It will be appreciated that housing section 504 and housing section 506 can together at least partially define end member chamber 502. It will be appreciated that housing sections 504 and 506 can be secured together in any suitable manner, such as by way of one or more threaded fasteners and/or by one or more flowed-material joints. In a preferred arrangement, end member housing 504 can be at least partially formed from a first materials, such as a metal material, for example, and end member housing 506 can be formed from a second material, such as a polymeric material, that is different than the first material. In such cases, housing sections 504 and 506 can, for example, be secured in abutting engagement with one another by way of a crimp ring 508 that extends peripherally about the housing sections and retains the housing sections in a substantially fixed axial position relative to one another.

It will be appreciated that gas spring and damper assembly AS1 is displaceable, during use in normal operation, between extended and compressed conditions. In some cases, one or more jounce bumpers can be included to inhibit contact between one or more features and/or components of assembly AS1. For example, a jounce bumper 228 on or along elongated damper rod 216 within spring chamber 302 adjacent end member assembly 500 to substantially inhibit contact between a component of damper assembly DP1 and end member assembly 500 during a full jounce condition of assembly AS1. It will be appreciated, however, that other configurations and/or arrangements could alternately be used.

Figure 11:
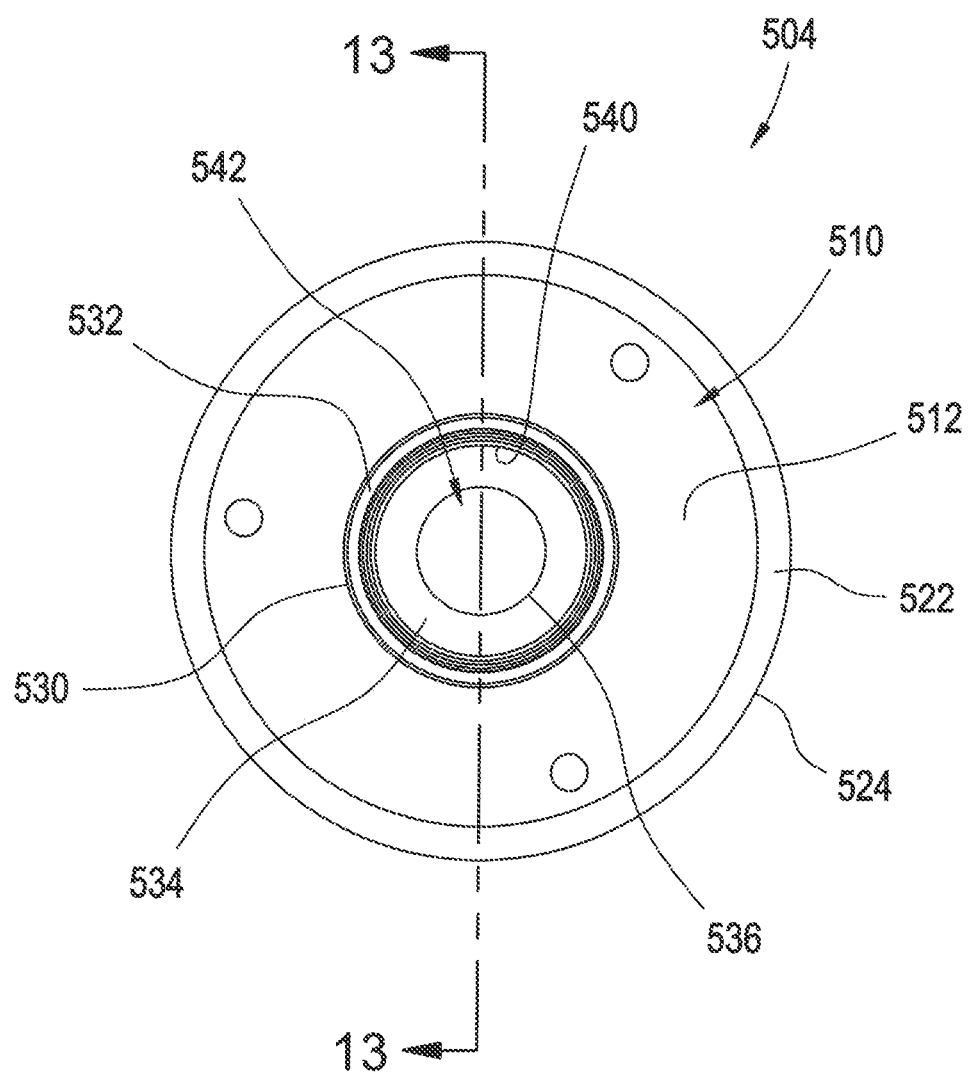
FIG. 11 is a top plan view of one example of an end member component of the end member assembly in FIGS. 2-10.
Figure 12:
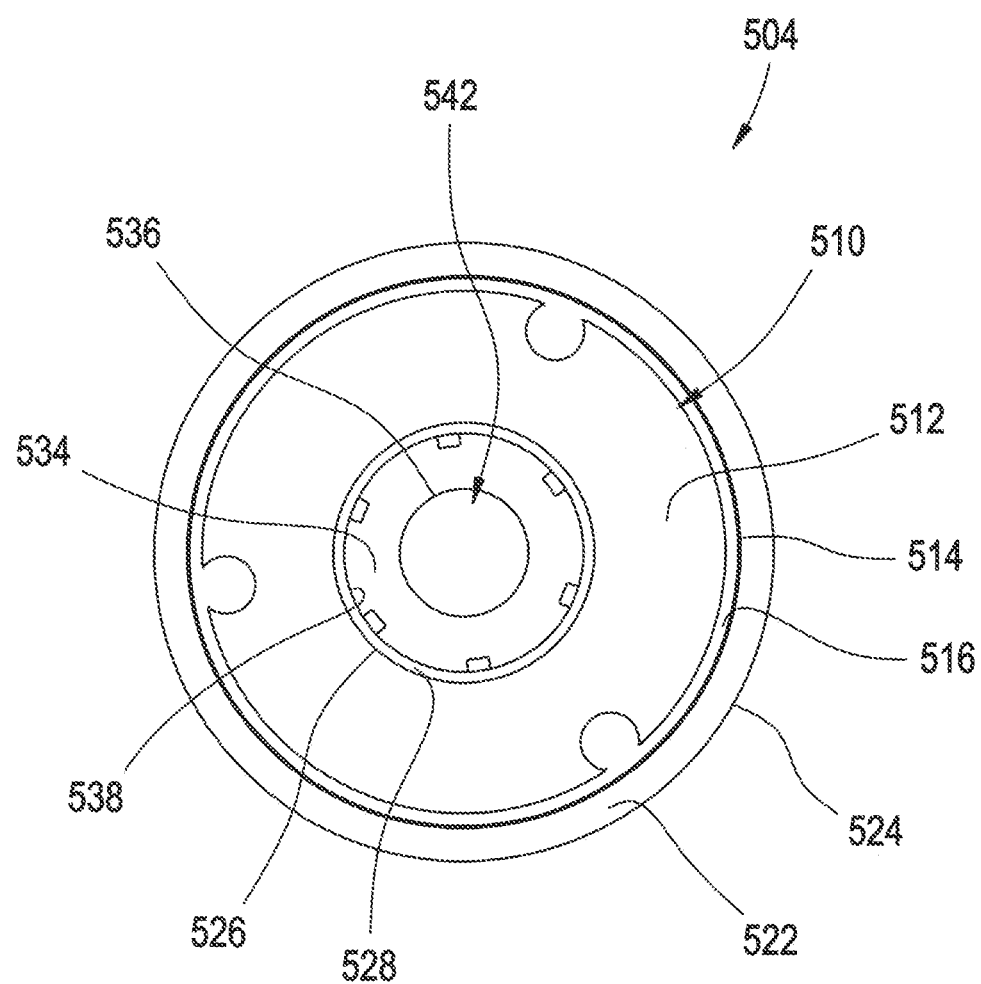
FIG. 12 is a bottom plan view of the end member component in FIGS. 2-11.
Figure 13:
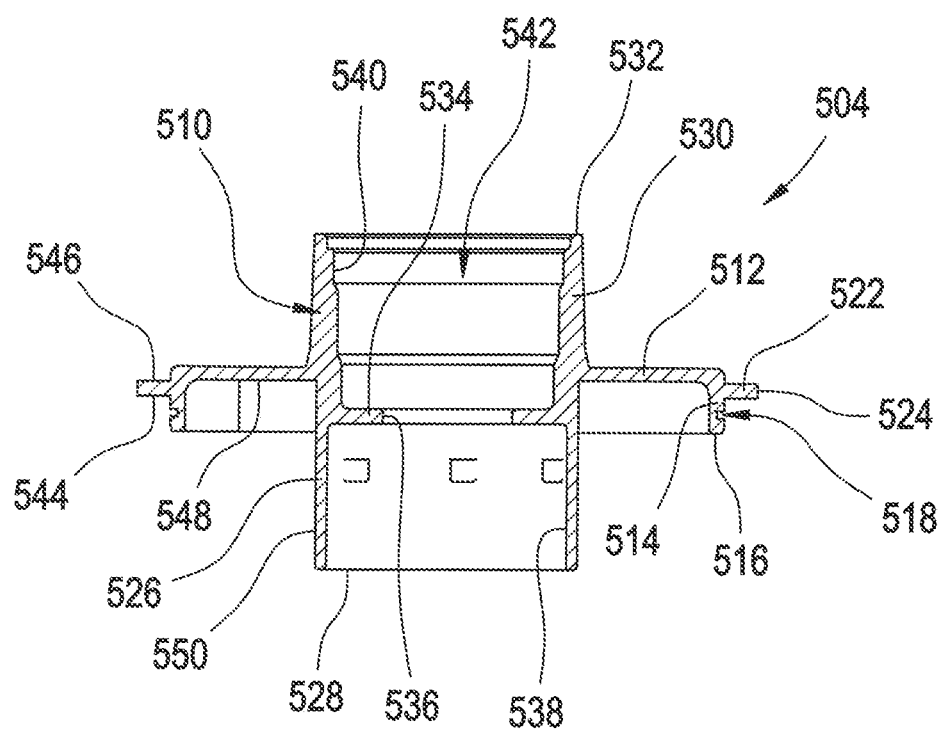
FIG. 13 a cross-sectional side view of the end member component in FIGS. 2-12 taken from along line 13-13 in FIG. 11.
Figure 14:
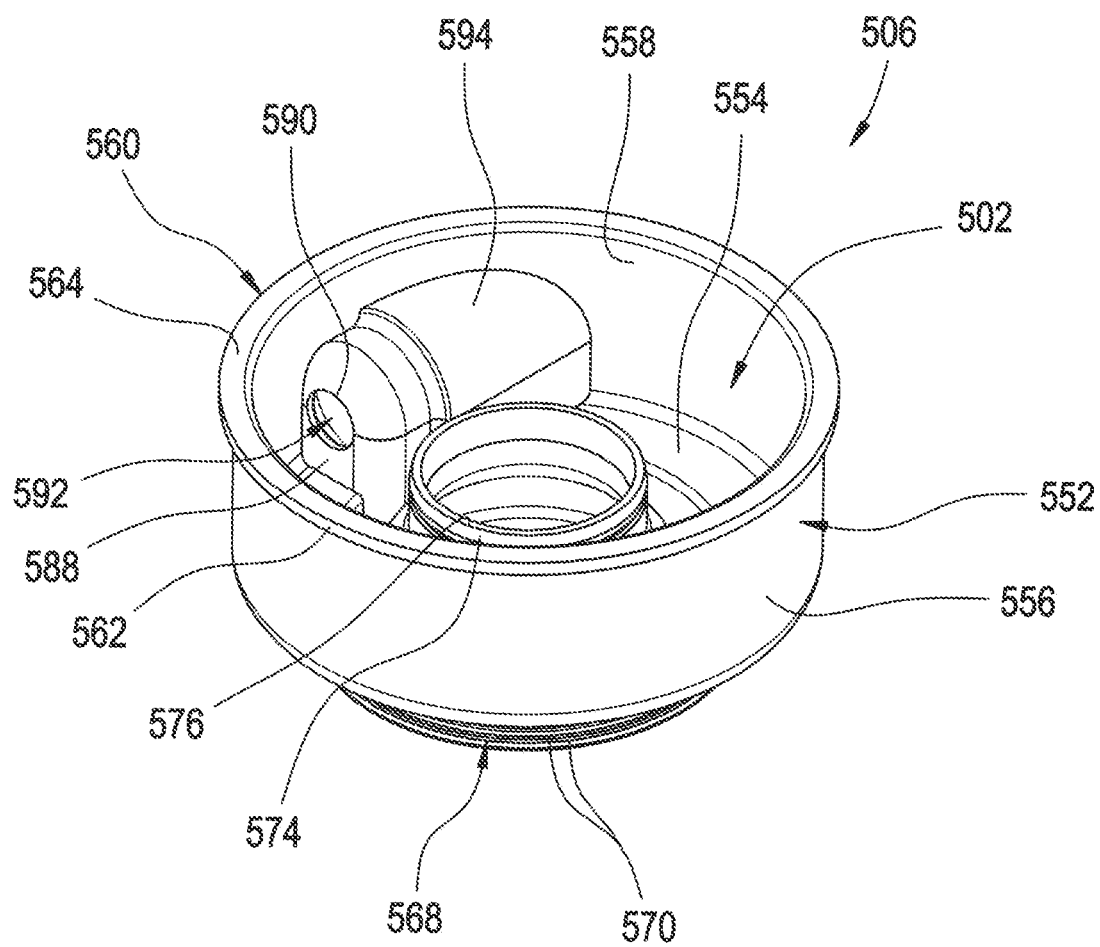
FIG. 14 is a top perspective view of another example of an end member component of the end member assembly in FIGS. 2-10.
Figure 15:
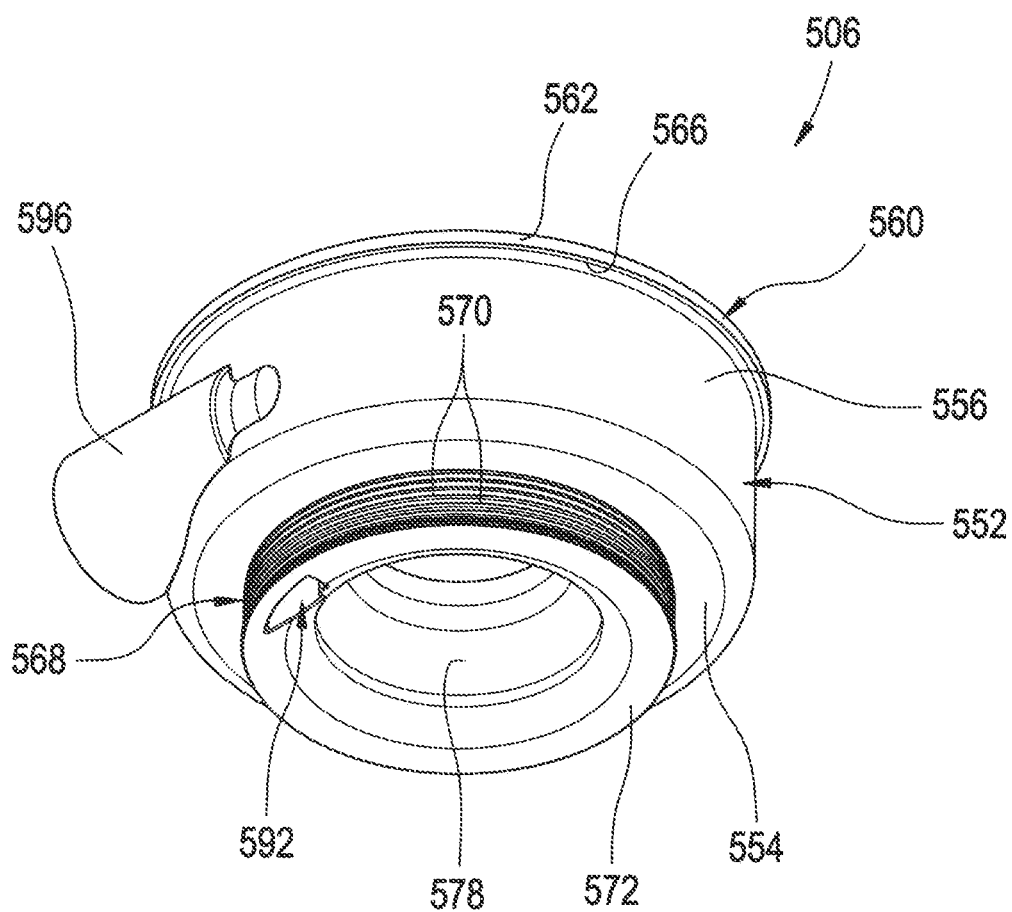
FIG. 15 is a bottom perspective view of the end member component in FIGS. 2-10 and 14.
Figure 16:
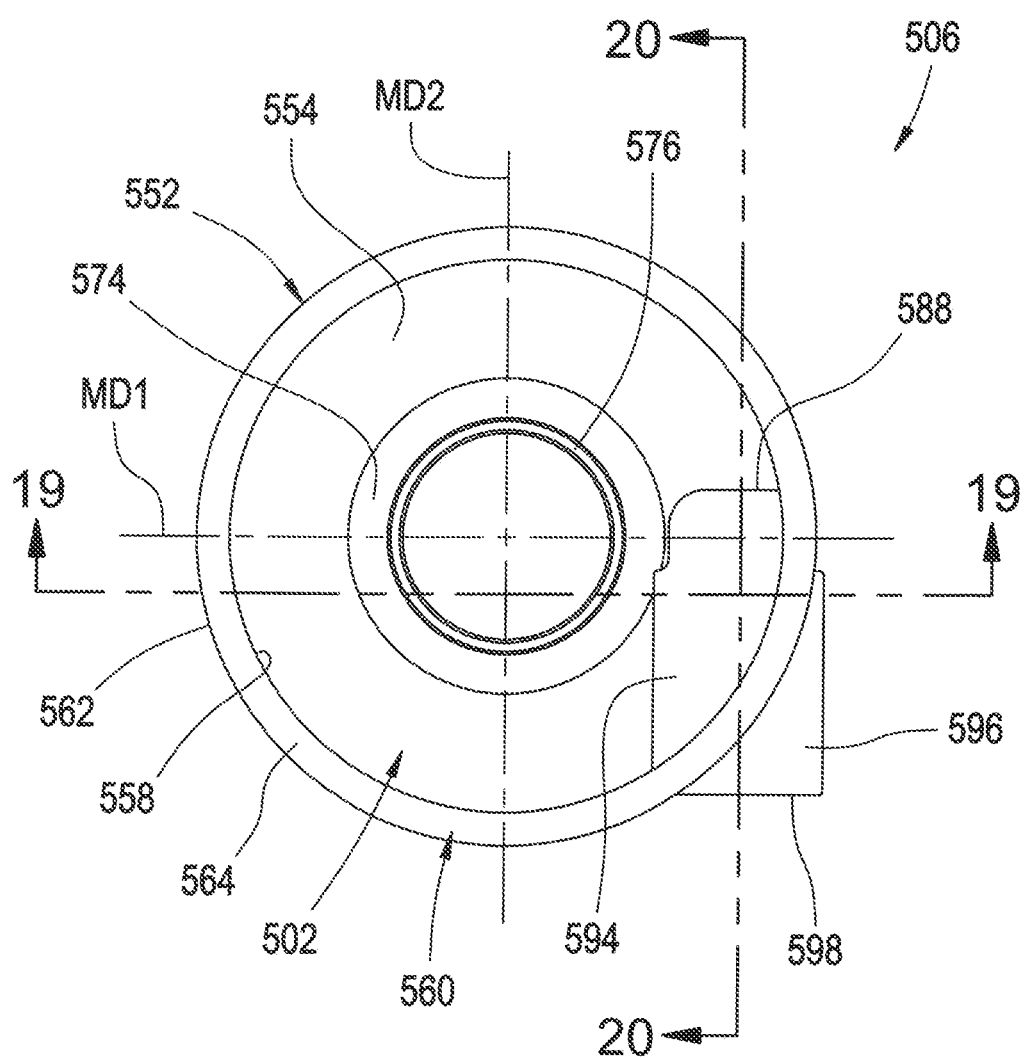
FIG. 16 is a top plan view of the end member component in FIGS. 2-10, 14 and 15.
Figure 17:
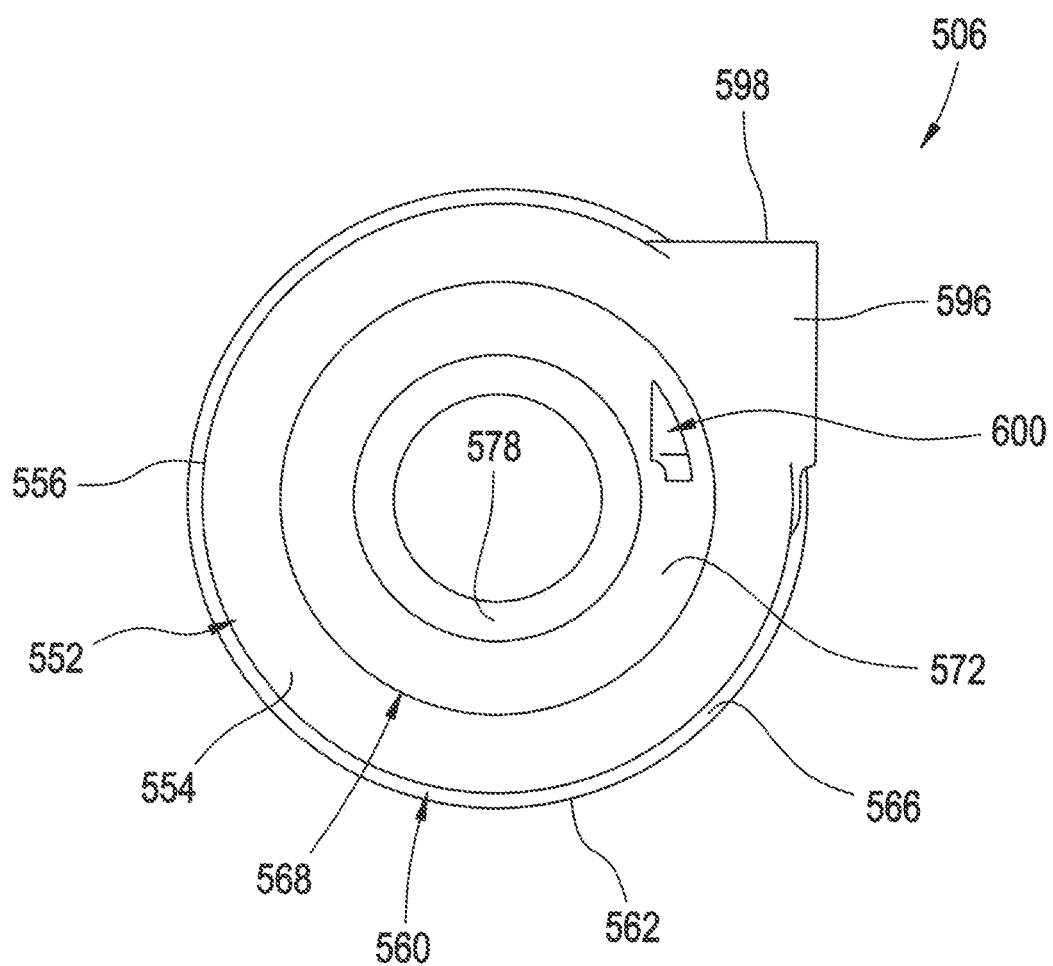
FIG. 17 is a bottom plan view of the end member component in FIGS. 2-10, and 14-16.

End member housing 504 can include any suitable number of walls and/or wall portions. For example, end member housing 504 is shown in FIGS. 11-13 as including a housing wall 510 with an outer end wall portion 512 that is oriented transverse to longitudinal axis AX and extends radially outward to an outer side wall portion 514 that extends axially from along outer end wall portion 512 toward a distal edge 516. In some cases, an annular groove 518 or other similar feature can be disposed along outer side wall portion 514, such as may be suitable for sealingly receiving a sealing element 520. An outer peripheral wall portion 522 extends radially outward from along outer side wall portion 514 to an outer peripheral edge 524. An inner side wall portion 526 extends axially from along outer end wall portion 512 toward a distal edge 528. Additionally, a side wall portion 530 can, optionally, extend axially from along outer end wall portion 512 in a direction opposite inner side wall portion 526 to a distal edge 532 that faces opposite distal edge 528. An inner end wall portion 534 can extend radially inward from along inner side wall portion 526 and/or side wall portion 530 toward an inner peripheral edge 536 that together with inner surface portions 538 and/or 540 of side wall portions 526 and/or 530, respectively, can at least partially define a passage 542 through end member housing 504. Additionally, outer peripheral wall portions can include opposing surface portions 544 and 546. Outer end wall portion 512 can include an inner surface portion 548 and/or inner side wall portion 526 can include an outer surface portion 550. Inner surface portion 548 and/or outer surface portion 550 can at least partially define housing chamber 502.

End member housing 506 can include any suitable number of walls and/or wall portions. For example, end member housing 506 is shown in FIGS. 14-20 as including a housing wall 552 with an end wall portion 554 that is oriented transverse to longitudinal axis AX and extends radially outward toward an outer side wall portion 556. An inner surface portion 558 is disposed along outer side wall portion 556 and at least partially defines housing chamber 502 with an outer surface portion 559 facing outward along outer side wall portion 556. Outer side wall portion 556 extends axially from along end wall portion 554 to a distal end wall portion 560 that includes an outer peripheral edge 562 as well as opposing surface portions 564 and 566. A crimp wall portion 568 is disposed radially inward of outer side wall portion 556 and extends from along end wall portion 554 in a direction away from outer side wall portion 556. Crimp wall portion 568 can include one or more securement structures 570 (e.g., annular grooves) disposed therealong and dimensioned to abuttingly engage and retain end 306 of flexible spring member 300. Housing wall 552 also includes an inner end wall portion 572 that extends between and operatively interconnects crimp wall portion 568 with an inner side wall portion 574 that extends axially in a direction away from the inner end wall portion toward a distal end 576. Inner side wall portion 574 can include a surface portion 578 facing radially inward and a surface portion 580 facing radially outward that can at least partially define housing chamber 502. Inner side wall portion 574 can be dimensioned to receivingly engage inner side wall portion 526 such that the wall portions are axially coextensive with inner surface portion 538 and surface portion 580 disposed in facing relation to one another. In some cases, an annular groove 582 or other similar feature can be disposed along inner side wall portion 578, such as may be suitable for sealingly receiving a sealing element 584, for example.

Housing wall 552 can also at least partially define one or more passages or passage portions that can permit fluid communication through one or more walls and/or wall portions of end member housing 506 such that housing cavity 502 can be disposed in fluid communication with spring chamber 302. Additionally, the one or more walls and/or wall portions can at least partially define an intermediate chamber 586 dimensioned to receive and retain in operable condition a control device CD1 disposed in fluid communication between housing cavity 502 and spring chamber 302. In such case, control device CD1 can be selectively operable between a condition in which the housing cavity and the spring chamber are substantially fluidically isolated from one another and a condition in which housing cavity 502 and spring chamber 302 are in fluid communication with one another. It will be appreciated that control device CD1 can be communicatively coupled with a suitable controller (e.g., controller 126), such as by way of a conductor or lead (e.g., conductors 132) communicatively coupled with a contact or other connector CT1 of the control device.

Control device CD1 can have a longitudinal axis LAX along which an actuation rod ARD or other component is displaced to switch a valve body VBD between open and close conditions. In a preferred arrangement, control device CD1 is oriented on or along end member assembly 500 such that longitudinal axis LAX is disposed transverse to longitudinal axis AX of gas spring and damper assembly AS1. In some cases, control device CD1 can, optionally, include a connector fitting dimensioned to operatively engage an associated pressurized gas line and can be operable to selectively permit pressurized gas to be transferred into and/or out of gas spring and damper assembly AS1. In other cases, a separate pressurized gas fitting (not shown) can be provided that will permit an associated pressurized gas line to be connected separately from the control device.

In the arrangement shown in FIGS. 2-10 and 14-20, housing wall 552 includes a chamber end wall portion 588 that extends axially from along end wall portion 554 and/or inner end wall portion 572 and is oriented in offset alignment with a midline MD1 (FIG. 16) of end member housing 506. Chamber end wall portion 588 includes an inner peripheral edge 590 that at least partially defines a passage portion 592 in fluid communication between intermediate chamber 586 and end member chamber 502. Housing wall 552 also includes a chamber inner side wall portion 594 and a chamber outer side wall portion 596 that extend between and operatively interconnect outer side wall portion 556 and inner side wall portion 574 to at least partially define intermediate chamber 586. Chamber inner side wall portion 594 and/or chamber outer side wall portion 596 extend(s) axially along longitudinal axis LAX in a direction oriented in offset alignment with a midline MD2 (FIG. 16) toward a distal end surface portion 598. Chamber inner side wall portion 594 can at least partially define a passage portion 600 in fluid communication between intermediate chamber 586 and spring chamber 302. In this manner, control device CD1 can be selectively operated to permit and inhibit fluid communication between spring chamber 302 and end member chamber 502 through passage portions 592 and 600 together with control device CD1 and intermediate chamber 586 that are disposed in fluid communication therebetween.

As discussed above, end member assembly 500 is shown and described herein as having a combination of walls and/or wall portions that at least partially define end member chamber 502 and intermediate chamber 586. In accordance with the subject matter of the present disclosure, one desirable goal of the subject constructions is to generate a large volume within the end member chamber while retaining a small overall exterior size. Such constructions also include an intermediate chamber with a control device operable to selectively switch the end member chamber into and out of fluid communication with the primary spring chamber of the gas spring and damper assembly. As a non-limiting example, such constructions will beneficially result in performance benefits due to a large volume of the end member chamber while allowing gas spring and damper assembly 102 and/or AS1 to take up a smaller amount of space in an installed condition or otherwise within an intended operating environment.

Figure 9:
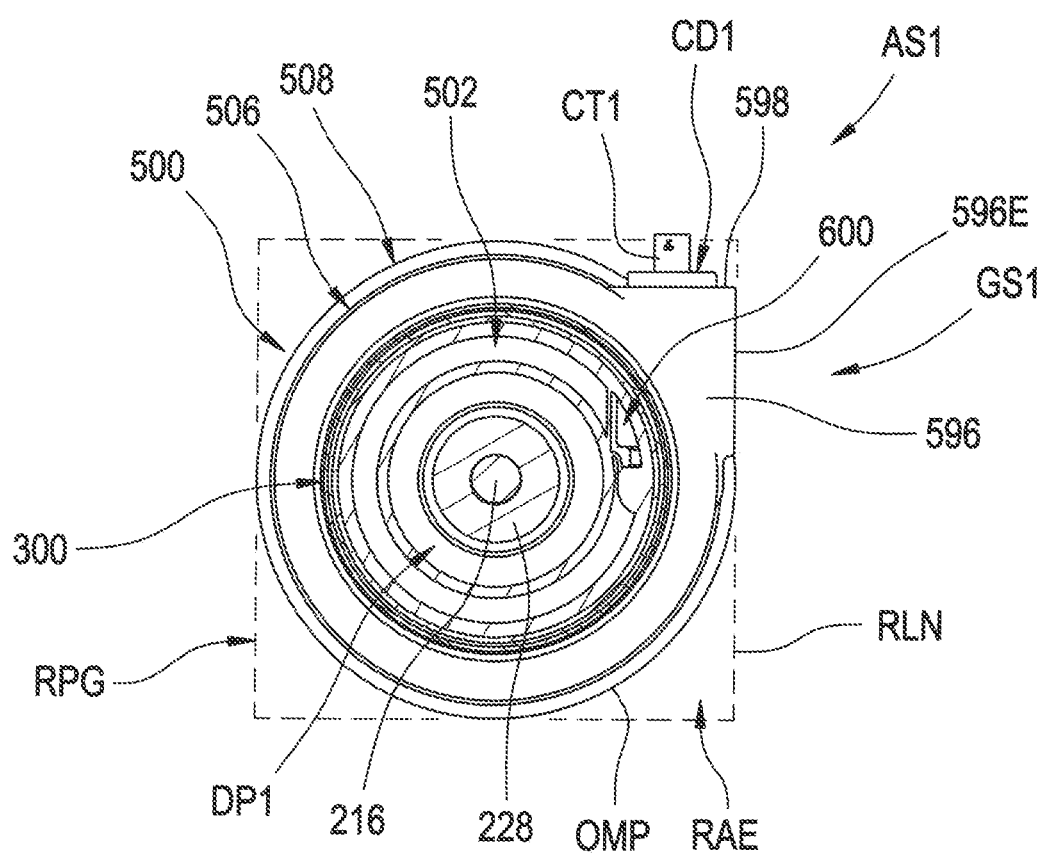
FIG. 9 is a cross-sectional plan view of the gas spring and damper assembly in FIGS. 2-8 taken from along line 9-9 in FIG. 5.
Figure 10:
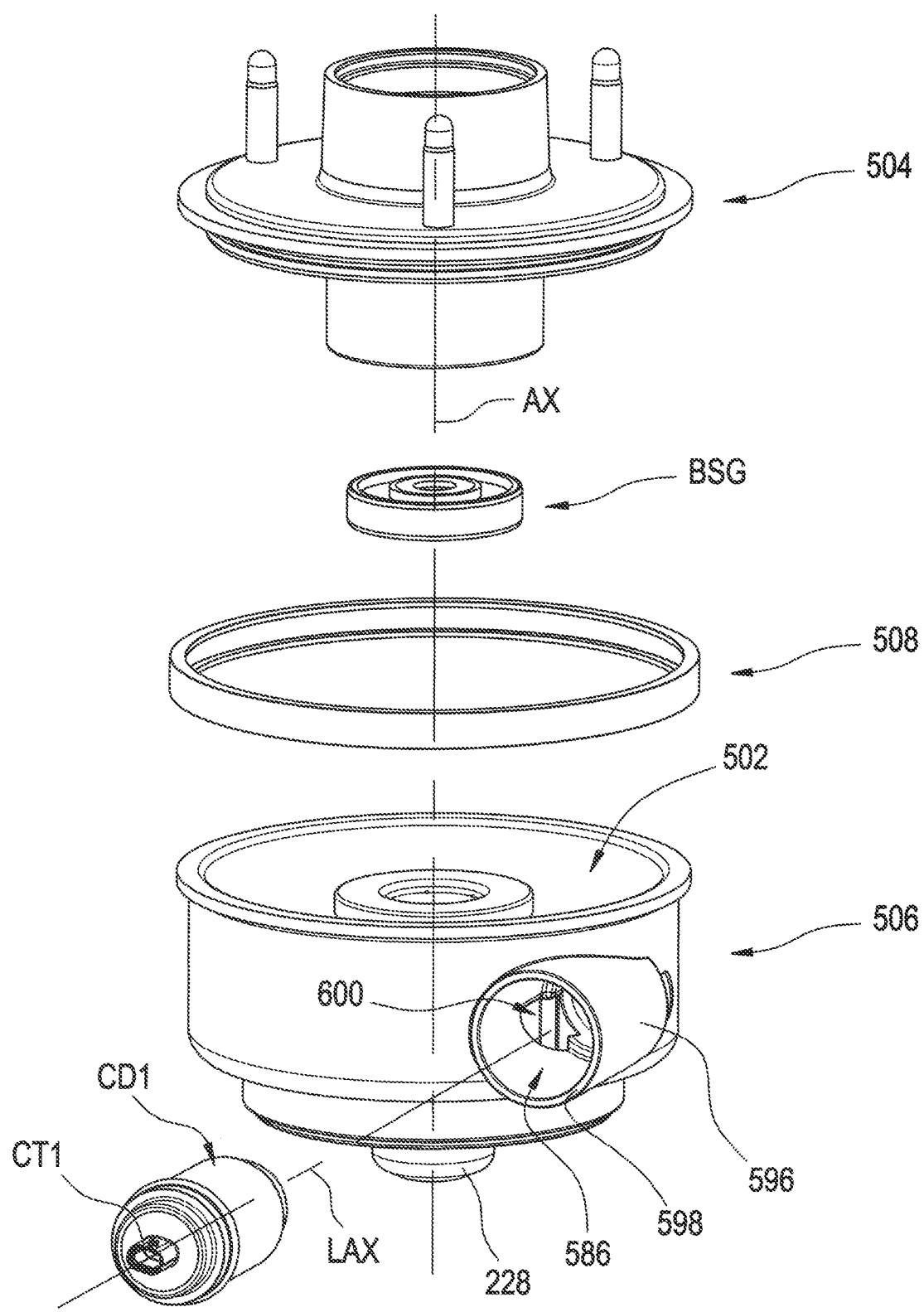
FIG. 10 is an exploded view of an end member assembly in accordance with the subject matter of the present disclosure, such as is shown in FIGS. 2-9, for example.
Figure 18:
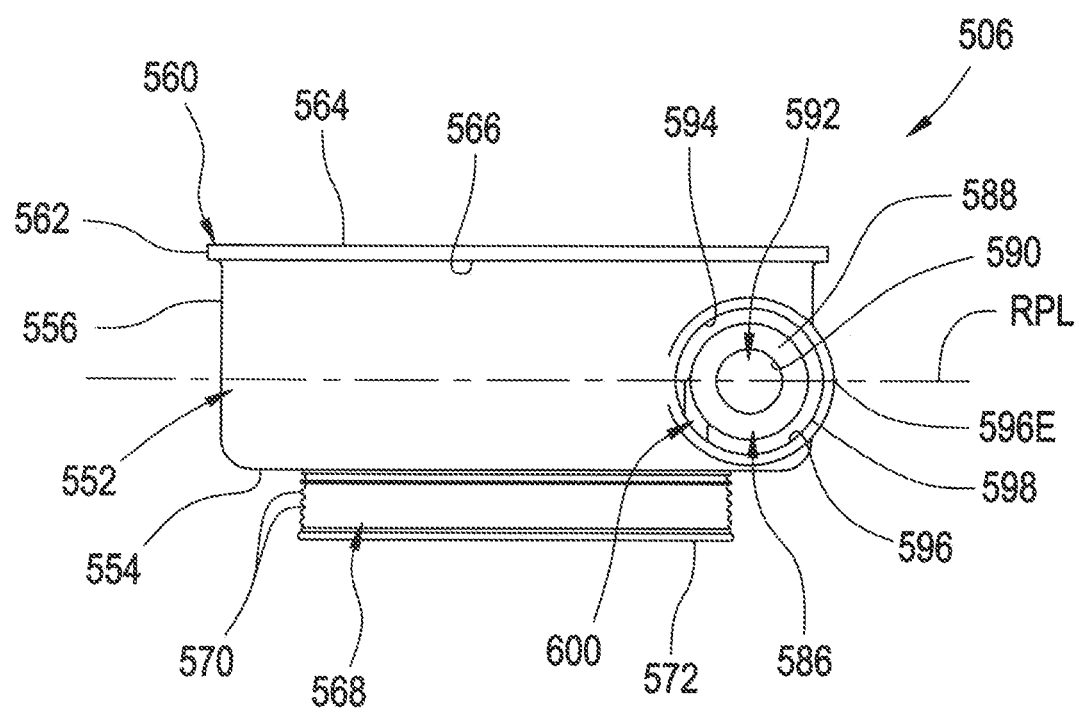
FIG. 18 is a side elevation view of the end member component in FIGS. 2-10 and 14-17.
Figure 19:
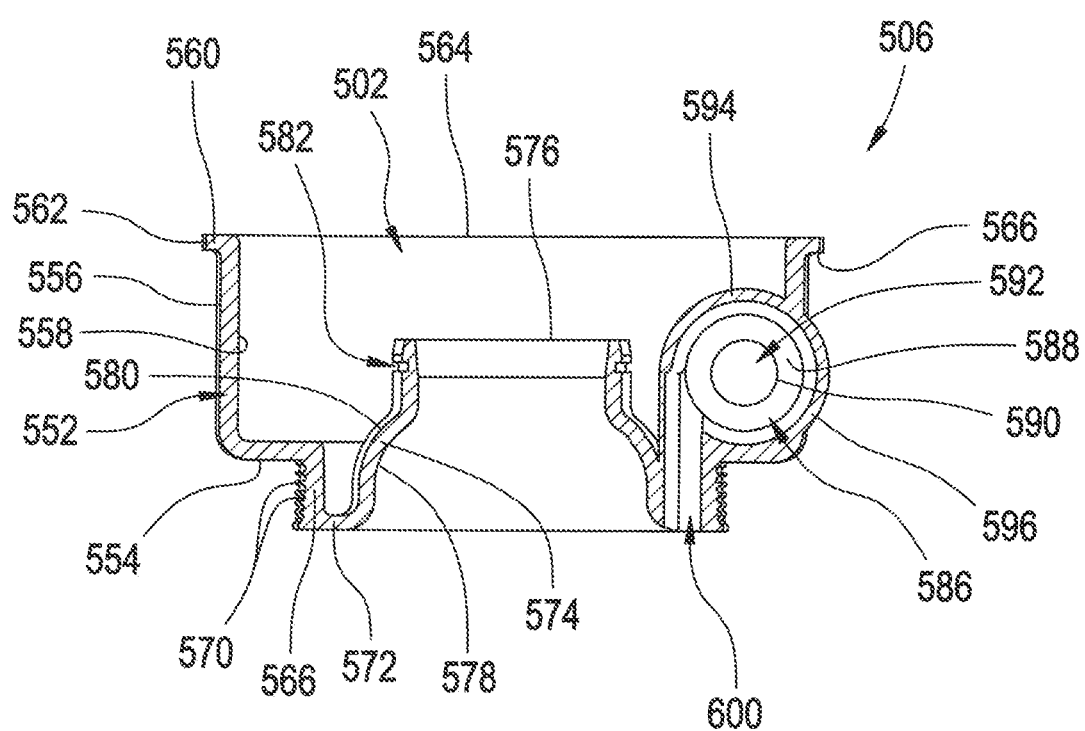
FIG. 19 is a cross-sectional side view of the end member component in FIGS. 2-10 and 14-18 taken from along line 19-19 in FIG. 16.
Figure 20:
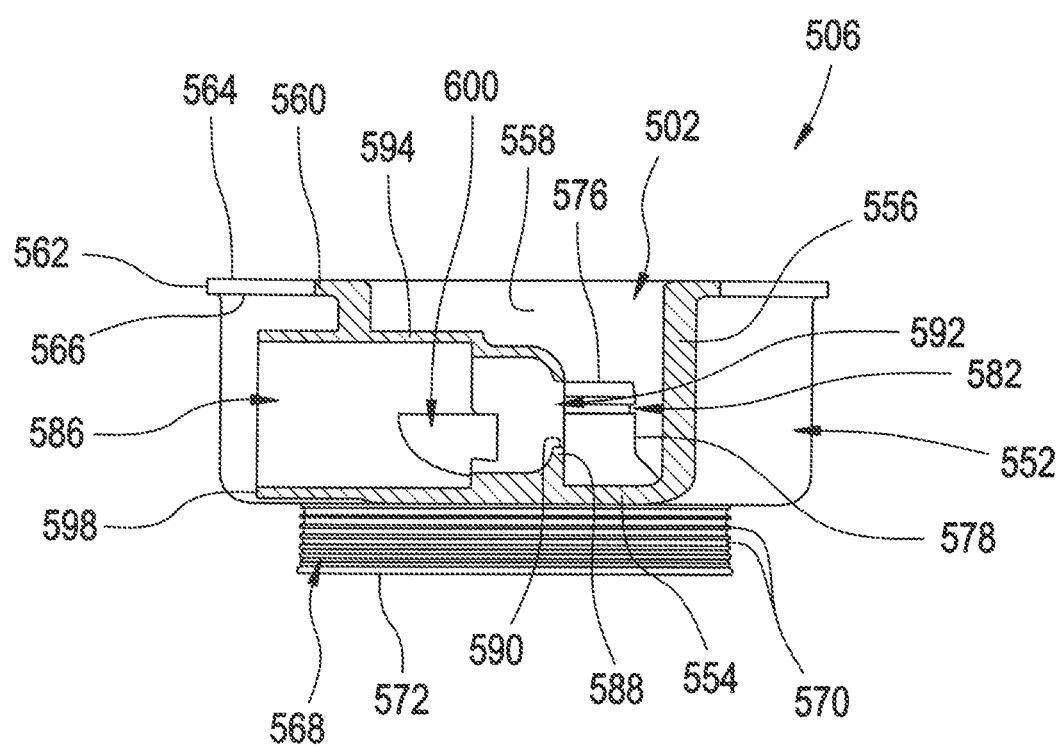
FIG. 20 is a cross-sectional side view of the end member component in FIGS. 2-10 and 14-19 taken from along line 20-20 in FIG. 16.

It will be appreciated that the desired and/or beneficial aspects of such a construction can be defined or otherwise established in any suitable manner. As a non-limiting example, a reference plane RPL is shown in FIGS. 5 and 18 that is oriented transverse to longitudinal axis AX. As shown in plan view in FIGS. 4 and 9, end member assembly 500 has an outermost peripheral profile or shape OMP when projected onto reference plane RPL. In a preferred arrangement, such an outermost peripheral profile or shape will fit substantially entirely within a reference area RAE defined by a reference polygon RPG, which can be formed by a plurality of reference lines RFL. Again, in a preferred arrangement, reference polygon RPG circumscribes or otherwise bounds the outermost peripheral profile or shape of end member assembly 500 as projected onto reference plane RPL. As shown in FIGS. 4 and 9, reference polygon RPG can include four or more reference lines RFL with one or more of reference lines RFL at least approximately tangential to the outermost peripheral profile or shape of end member assembly 500. In some cases, reference polygon RPG can have an approximately rectangular shape. In some cases, reference polygon RPG can be equiangular. In some cases, reference polygon RPG can be equilateral. In some cases, reference polygon RPG can be a regular polygon that is both equiangular and equilateral.

As shown and described herein, at least outer side wall portion 556 of housing wall 552 extends peripherally at least partially around longitudinal axis AX and has a curvature. Additionally, chamber outer side wall portion 596 of housing wall 552 extends peripherally around longitudinal axis LAX of intermediate chamber 586 and has a curvature. As such, the curvature of chamber outer side wall portion 596 is transverse to the curvature of outer side wall portion 556. Similarly, chamber inner side wall portion 594 extends peripherally around longitudinal axis LAX of the intermediate chamber and has a curvature that is transverse to the curvature of outer side wall portion 556. In some cases, a tangential edge 596E of chamber outer side wall portion 596 can be coextensive with a reference line RFL of reference polygon RPG. Additionally, in some cases, tangential edge 596E of chamber outer side wall portion 596 can be colinear with a reference line RFL. In a preferred arrangement, tangential edge 596E of chamber outer side wall portion 596 can be coextensive and colinear with a reference line RFL, such as is shown in FIGS. 4 and 9, for example.

In an assembled condition, surface portion 544 of end member housing 504 and surface portion 564 of end member housing 506 are disposed in facing relation to one another. Crimp ring 508 can extend peripherally around outer peripheral wall portion 522 and distal end wall portion 560 to retain the end member housings in an assembled condition. In some cases, a bushing BSG can be received within passage portion 542, such as along inner surface portion 540 and operatively engage one or more components of damper assembly DP1.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure. To aid the Patent Office and any readers of this application and any resulting patent in interpreting the claims appended hereto, Applicant does not intend any of the appended claims or any claim elements to invoke 35 U.S.C. 112(f) unless the words "means for" or "step for" are explicitly used in the particular claim.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A gas spring and damper assembly comprising:
   a damper assembly having a longitudinally-extending axis and including:
      a damper housing including a housing wall extending axially between opposing first and second ends, said housing wall at least partially defining a damping chamber containing a quantity of damping fluid; and,
      a damper rod assembly including an elongated damper rod and a damper piston secured along said elongated damper rod, said damper rod assembly operatively interengaged with said damper housing for reciprocal displacement relative thereto with said damper piston disposed within said damping chamber and at least a portion of said elongated damper rod projecting axially-outwardly from said first end of said damper housing; and,
   a gas spring assembly disposed in axially coextensive relation with at least a portion of said damper assembly, said gas spring assembly including:
      a flexible spring member extending peripherally about said longitudinal axis and longitudinally between opposing first and second ends such that a spring chamber is at least partially defined therebetween;
      a first end member assembly operatively connected to said elongated damper rod and operatively secured across said first end of said flexible spring member such that a substantially fluid-tight connection is formed therebetween, said first end member assembly having a first midline and a second midline disposed in a common plane with said second midline intersecting said first midline at said longitudinal axis, said first end member assembly including a first end member wall that includes:
         a first wall portion extending peripherally about said longitudinal axis and at least partially defining an end member chamber inward thereof, said first wall portion having an outer peripheral surface portion;
         a second wall portion projecting outwardly beyond said outer peripheral surface portion of said first wall portion, said second wall portion at least partially defining an intermediate chamber in fluid communication with said end member chamber and dimensioned to at least partially receive an associated control device, said intermediate chamber having a chamber axis oriented transverse to said longitudinal axis and said first midline, said chamber axis disposed in laterally offset alignment with said second midline; and,
         a third wall portion at least partially defining an end member passage through which said end member chamber can be selectively placed in fluid communication with said spring chamber by way of said intermediate chamber and the associated control device; and,
      a second end member assembly supported on said damper housing and operatively secured across said second end of said flexible spring member such that a substantially fluid-tight connection is formed therebetween.

2. A gas spring and damper assembly according to claim 1, wherein said second wall portion is curved around said chamber axis in a direction transverse to said first wall portion.

3. A gas spring and damper assembly according to claim 2, wherein said first end member wall includes a fourth wall portion disposed inward of said first and second wall portions and at least partially defining said intermediate chamber.

4. A gas spring and damper assembly according to claim 3, wherein said fourth wall portion is oriented transverse to said longitudinal axis and said chamber axis, and includes a passage portion in fluid communication between said end member chamber and said intermediate chamber.

5. A gas spring and damper assembly according to claim 3, wherein said first end member wall includes a fifth wall portion disposed inward of said first and second wall portions with said fifth wall portion curved around said chamber axis such that said second and fifth wall portions at least partially define a cylindrical shape of said intermediate chamber.

6. A suspension system comprising:
 a pressurized gas system including a pressurized gas source and a control device; and,
 at least one gas spring and damper assembly according to claim 1 disposed in fluid communication with said pressurized gas source through said control device such that pressurized gas can be selectively transferred into and out of at least said spring chamber.

7. A gas spring and damper assembly according to claim 1, wherein said second wall portion is curved around said chamber axis and extends lengthwise therealong from an open end of said intermediate chamber into approximately tangential engagement with said first wall portion.

8. A gas spring and damper assembly according to claim 1, wherein said first end member assembly has a reference plane oriented transverse to said longitudinal axis with a reference area formed by a reference polygon circumscribing said outer peripheral surface portion of said first wall portion and a cross-section of at least said first end member assembly along said reference plane is disposed within said reference polygon.

9. A gas spring and damper assembly according to claim 8, wherein a tangential edge of said second wall portion is coextensive with a reference line of said reference polygon.

10. A gas spring and damper assembly according to claim 8, wherein said tangential edge of said second wall portion is colinear with said reference line of said reference polygon.

11. A gas spring and damper assembly according to claim 8, wherein said reference polygon is at least one of equiangular and equilateral.

12. A gas spring and damper assembly according to claim 1, wherein said end member chamber has a substantially fixed volume.

13. A gas spring and damper assembly according to claim 1, wherein said first end member assembly includes:
 a first end member component including a first end surface portion; and,
 a second end member component including a second end surface portion, said second end member component oriented such that said second end surface portion is disposed in facing relation to said first end surface portion to at least partially define said end member chamber.

14. A gas spring and damper assembly according to claim 13, wherein said first end member assembly includes a crimp ring operatively connecting said first and second end member components in abutting engagement with one another.

15. A gas spring and damper assembly comprising:
 a damper assembly having a longitudinally-extending axis and including:
  a damper housing including a housing wall extending axially between opposing first and second ends, said housing wall at least partially defining a damping chamber containing a quantity of damping fluid; and,
  a damper rod assembly including an elongated damper rod and a damper piston secured along said elongated damper rod, said damper rod assembly operatively interengaged with said damper housing for reciprocal displacement relative thereto with said damper piston disposed within said damping chamber and at least a portion of said elongated damper rod projecting axially-outwardly from said first end of said damper housing; and,
 a gas spring assembly disposed in axially coextensive relation with at least a portion of said damper assembly, said gas spring assembly including:
  a flexible spring member extending peripherally about said longitudinal axis and longitudinally between opposing first and second ends such that a spring chamber is at least partially defined therebetween;
  a first end member assembly operatively connected to said elongated damper rod and operatively secured across said first end of said flexible spring member such that a substantially fluid-tight connection is formed therebetween, said first end member assembly having a first midline and a second midline disposed in a common plane with said second midline intersecting said first midline at said longitudinal axis, said first end member assembly including a first end member wall that includes:
   a first wall portion extending peripherally about said longitudinal axis and at least partially defining an end member chamber inward thereof, said first wall portion having an outer peripheral surface portion;
   a second wall portion projecting outwardly beyond said outer peripheral surface portion of said first wall portion, said second wall portion at least partially defining an intermediate chamber in fluid communication with said end member chamber, said intermediate chamber having a chamber axis oriented transverse to said longitudinal axis and said first midline, said chamber axis disposed in laterally offset alignment with said second midline; and
   a third wall portion at least partially defining an end member passage in fluid communication with said spring chamber and said end member chamber; and,
  a second end member assembly supported on said damper housing and operatively secured across said second end of said flexible spring member such that a substantially fluid-tight connection is formed therebetween; and,
  a control device disposed at least partially within said intermediate chamber, said control device being selectively operable between a first operative condition and a second operative condition, in said first operative condition said end member chamber and said intermediate chamber are substantially fluidically isolated from said spring chamber and in said second operative condition said end member chamber and said spring chamber are disposed in fluid communication with one another through said intermediate chamber and said end member passage.

16. A gas spring and damper assembly according to claim 15, wherein said control device includes an electrically-controlled actuator rod oriented transverse to said longitudinal axis.

17. A gas spring and damper assembly according to claim 15, wherein said second wall portion is curved around said chamber axis and extends lengthwise therealong from an open end of said intermediate chamber into approximately tangential engagement with said first wall portion.

18. A gas spring and damper assembly comprising:
a damper assembly having a longitudinal axis; and,
a gas spring assembly disposed in axially coextensive relation with at least a portion of said damper assembly, said gas spring assembly including a spring chamber and an end member assembly operatively connected to said damper assembly, said end member assembly including a first midline oriented transverse to said longitudinal axis and a second midline oriented transverse to said longitudinal axis and said first midline, said first and second midlines being disposed in a common plane oriented transverse to said longitudinal and said end member assembly including an end member wall that includes:
a first wall portion extending peripherally about said longitudinal axis and at least partially defining an end member chamber radially inward thereof that includes a chamber axis disposed in offset alignment with said first midline and transverse to said longitudinal axis and said second midline, said first wall portion having an outer peripheral surface portion;
a second wall portion projecting outwardly beyond said outer peripheral surface portion of said first wall portion, said second wall portion at least partially defining an intermediate chamber in fluid communication with said end member chamber, said intermediate chamber having a chamber axis oriented transverse to said longitudinal axis and said first midline, and said chamber axis disposed in laterally offset alignment with said second midline; and,
a third wall portion at least partially defining an end member passage through which said end member chamber can be selectively placed in fluid communication with said spring chamber by way of said intermediate chamber.

19. A gas spring and damper assembly according to claim 18, wherein said end member assembly has a reference plane oriented transverse to said longitudinal axis with a reference area formed by a reference polygon circumscribing said outer peripheral surface portion of said first wall portion such that a cross-section of at least said end member assembly along said reference plane is disposed within said reference polygon.

20. A gas spring and damper assembly according to claim 18, wherein said second wall portion is curved around said chamber axis and extends lengthwise therealong from an open end of said intermediate chamber into approximately tangential engagement with said first wall portion.

* * * * *